Nov. 7, 1939.   I. M. STEIN   2,178,617
METHOD OF AND APPARATUS FOR DETERMINING CHARACTERISTICS OF DIELECTRICS
Filed March 5, 1936   7 Sheets-Sheet 2

Nov. 7, 1939.   I. M. STEIN   2,178,617
METHOD OF AND APPARATUS FOR DETERMINING CHARACTERISTICS OF DIELECTRICS
Filed March 5, 1936   7 Sheets-Sheet 3

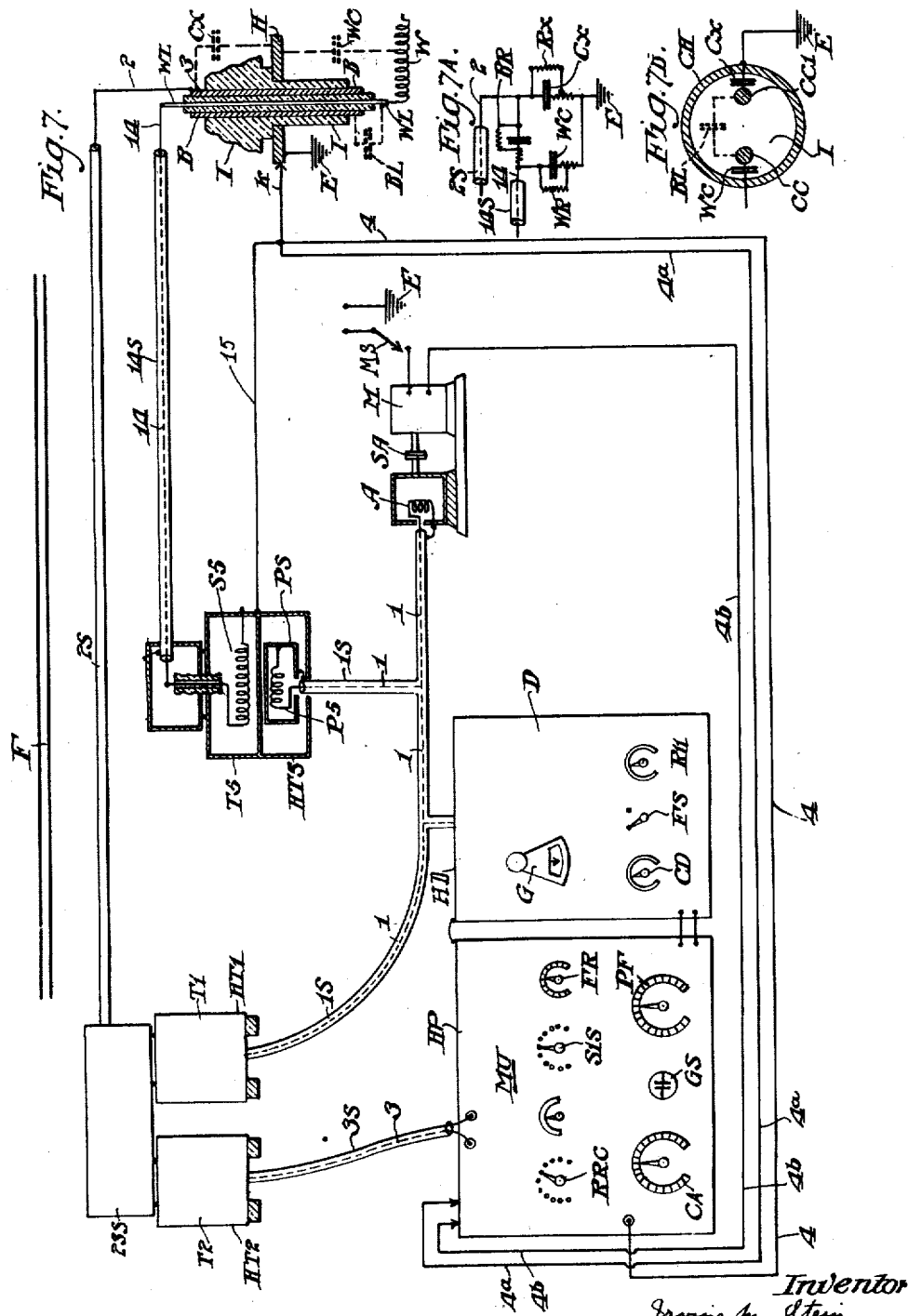

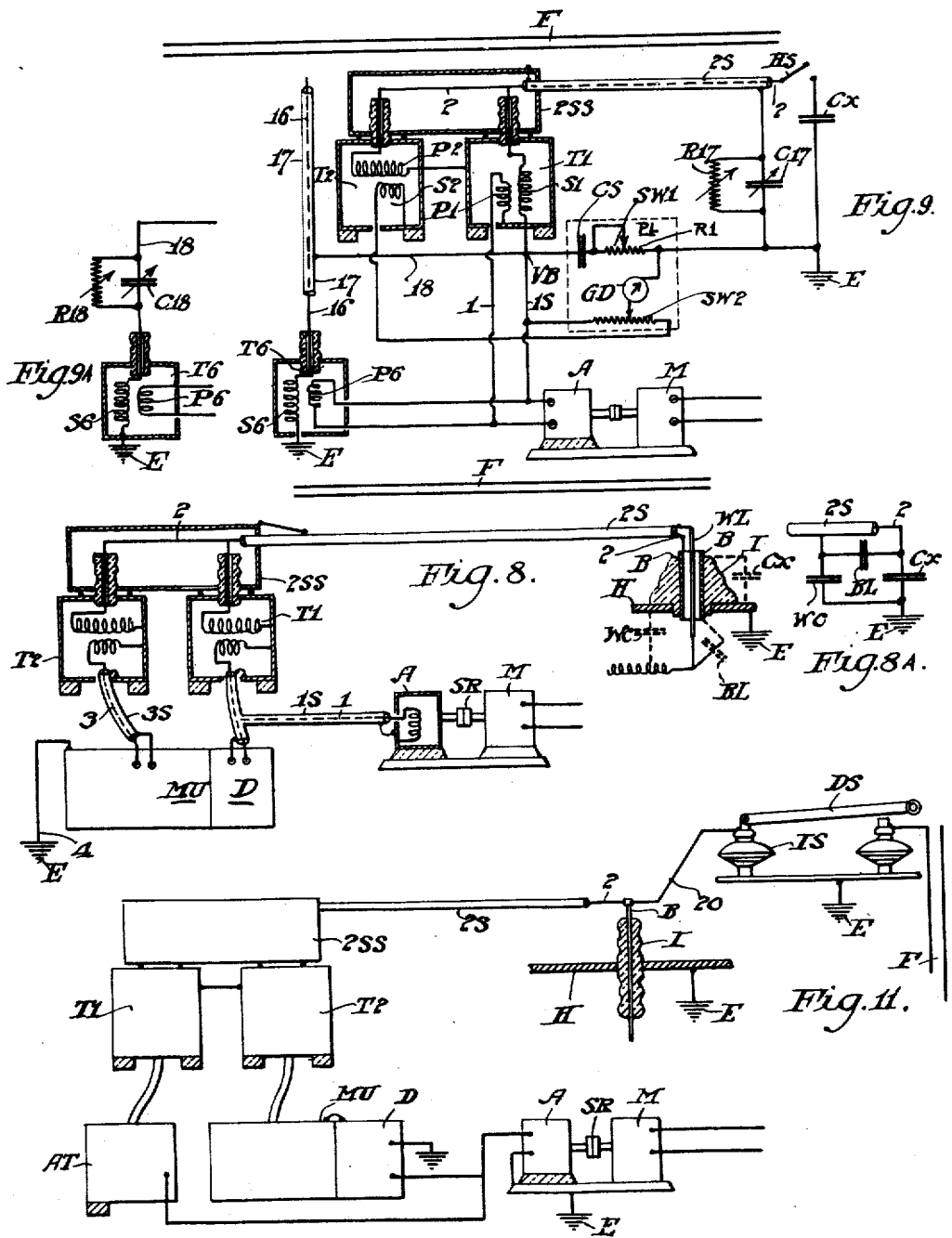

Inventor
Irving M. Stein
By Cornelius D. Ehret
Attorney.

Patented Nov. 7, 1939

2,178,617

UNITED STATES PATENT OFFICE 2,178,617

METHOD OF AND APPARATUS FOR DETERMINING CHARACTERISTICS OF DIELECTRICS

Irving M. Stein, Philadelphia, Pa., assignor to Leeds & Northrup Company, Philadelphia, Pa., a corporation of Pennsylvania Application March 5, 1936, Serial No. 67,297

40 Claims. (Cl. 175—183)

My invention relates to a system, method and apparatus, for determining qualitatively and particularly quantitatively, characteristics of electrical apparatus or equipment, and more particularly for determining the characteristics of dielectric or insulating material, used more especially in high-tension systems, especially by measurement of its impedance, power factor or phase angle. Tests or measurements of characteristics of a given dielectric specimen may be made at suitable intervals for determining, upon comparison of the tests or measurements taken at different times, the progress of change, usually decadence, in the qualities and characteristics of the dielectric. The dielectrics or insulating materials whose characteristics are to be determined, may be of any character or for any purpose and may include the insulators of power lines or other conductor systems, insulators or insulation of transformers, switchgear, insulating oils used in transformers, switchgear and the like, or the dielectric of a cable, between its conductors or between a conductor and its sheath.

In accordance with my invention, the system comprises apparatus for indicating, measuring or detecting electrical quantities representative of one or more of the aforesaid characteristics, with which is associated a source of measuring or testing current having a frequency different from, either greater or less than, the frequency or frequencies of electrostatic and/or electromagnetic field or fields within which the testing apparatus, or the dielectric under investigation, or both, is or are exposed during the determination of any of the characteristics aforesaid; further, in accordance with my invention, the frequency difference may have a magnitude of ranging from a suitable fraction, as one-half of one cycle per second, upwardly to any suitable number of cycles per second; in association with means, generally within the measuring system itself, or within detecting or indicating means associated with the measuring system, which by inherent characteristic or because of environment thereof, is insensitive to or uninfluenced by the disturbing electrostatic and/or electromagnetic fields.

More particularly, the testing or measuring apparatus may comprise balanceable networks or systems, including potentiometers, bridges and, in general, circuits or systems by which the characteristics are by null methods determined; or apparatus determinative of the characteristics by deflection methods, including wattmeters, ammeters and the like.

Further in accordance with my invention the measuring or testing network comprises a condenser, employed as a standard, whose power factor and capacitance remain to high degree constant, and whose capacitance is of a magnitude so large as effectively to swamp or render negligible the effects of the inherent or stray capacities, of fixed or varying magnitudes, which are effectively in shunt to the significant measuring impedance which includes the aforesaid condenser.

Further in accordance with my invention measuring systems of the characters aforesaid are utilizable for determining the characteristics of dielectrics or insulators in service related to impedances, including transformer windings, without complete dissociation or disassembly of the impedances and dielectrics or insulators from each other; further in accordance with my invention for this purpose there is utilized an auxiliary transformer which so impresses upon the aforesaid impedance or its lead a voltage of such magnitude and of the same frequency as that of the measuring or testing current, that the measuring or testing current flows only through the dielectric or insulator and does not flow through the capacity or capacities associated therewith and due to the presence of the impedance; and further in accordance with my invention for this purpose there may alternatively be utilized the same transformer which supplies the measuring or testing current, in a relation such that the current or currents which flows or flow through the capacity or capacities associated with the dielectric or insulator and due to the presence of the impedance, does not affect the measuring circuit proper.

Further in accordance with my invention the effect of the charging current, due to the impression upon the exposed conductors of the testing or measuring system of the voltage of the source which furnishes the testing or measuring current, which otherwise would flow through the measuring or testing circuit proper, is rendered negligible by recourse to an auxiliary transformer, or by arranging the testing or measuring circuit for taking alternate readings.

My invention resides in further aspects and features of method and apparatus hereinafter described.

For an understanding of my invention, and for illustration of some of various of the forms and aspects my invention may take, reference is to be had to the accompanying drawings, in which:

Fig. 1A is a fragmentary diagrammatic view illustrative of the electrical characteristics of a dielectric or specimen under test;

Fig. 1B is a fragmentary view illustrative of the specimen under test when a cable;

Fig. 1C is a fragmentary view of the specimen when a fluid dielectric;

Fig. 1D is a fragmentary diagrammatic illustration of means for effecting a change in the magnitude of the test or measuring voltage;

Fig. 1E is a fragmentary diagrammatic view of a network for passing current of test frequency and for rejecting or excluding currents of different frequency;

Fig. 7 is a view, in part diagrammatic, illustrative of a system suited for determination of characteristics of dielectrics without dissociation from parts which introduce characteristics in addition to or in complication of those of the dielectric itself;

Fig. 7A is a fragmentary diagrammatic view illustrative of the electrical characteristics of a dielectric in an environment corresponding with that of Fig. 7 or equivalent system;

Fig. 7B is a fragmentary view corresponding generally with Fig. 7A or equivalent system, when the dielectric is that of a multi-conductor cable;

Fig. 8 is a diagrammatic view of another system in accordance with my invention, particularly suitable for the cases where the dielectric specimen is of the general character of the specimens of Fig. 7, 7A and 7B or equivalent systems;

Fig. 8A is a fragmentary diagrammatic view illustrating a part of Fig. 8, and including a diagrammatic representation of electrical characteristics of a specimen of Fig. 8 or equivalent system;

Fig. 9 is a diagrammatic view of another system in accordance with my invention;

Fig. 9A is a fragmentary diagrammatic view of a modification of a part of Fig. 9 or equivalent system;

Fig. 11 is a view, in part diagrammatic, of a modified arrangement in accordance with my invention;

Figure 1:
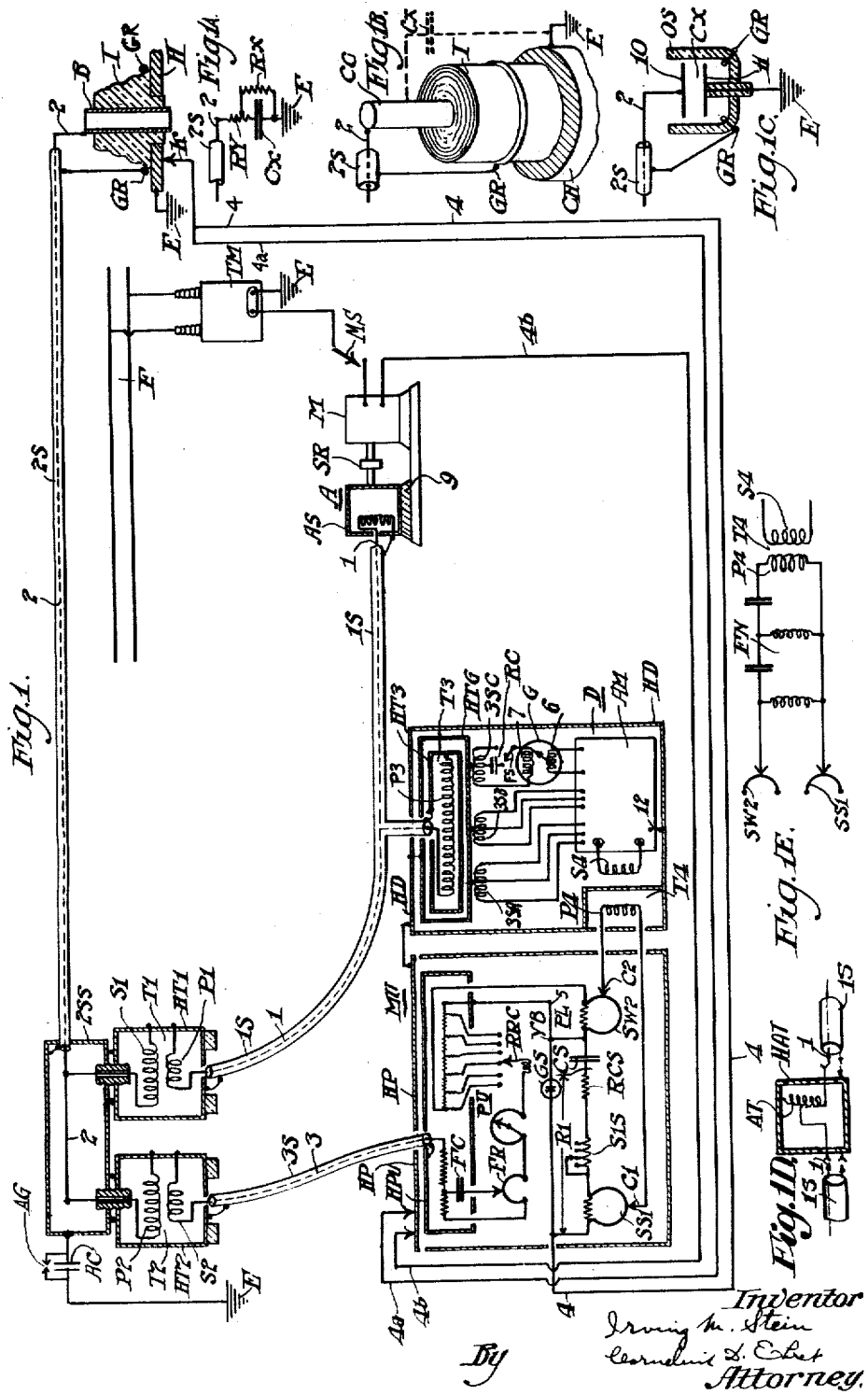
Figure 1 is a view, largely diagrammatic, illustrative of one of the forms my invention may take.

Referring to Fig. 1, which illustrates one modification of my invention and as used, in this example, to measure the power factor and capacitance of any dielectric or insulating material, in this example, an insulator I, the source of alternating testing current is represented by the alternator A which may be a self-excited machine and is driven by a suitable prime mover, electrical or not, as motor M, to supply current to the primary PI of a step-up transformer TI whose output voltage may be of the order of 10,000 volts or higher. The high voltage terminal of the secondary SI of transformer TI is connected by conductor 2 to the metal bushing B of the insulator I under test. The conductor 2 is also connected to the primary P2, of the step-down transformer T2 (primary P2 is connected in parallel with secondary SI) whose secondary S2 supplies current to the branch PU of a potentiometer network in the housing HP of the measuring unit MU. The step-down ratio of transformer T2 is anything suitable or desirable; for convenience it may be the same as the step-up ratio of transformer TI.

The test current through the insulator I passes through conductor 4 to one terminal of resistance RI in the branch PL of the potentiometer network, and thence through the condenser CS which is connected by conductor 5 through the conductor 3S and the transformer casings HT2, HTI to the low potential terminal of the secondary SI.

Condenser CS and resistance RI constitute the significant measuring impedance traversed by the current passed through the dielectric under test, in this example the insulator I.

The potentiometer network is balanced by adjusting the contacts CI and C2 along the slide-wire impedances SSI and SW2 until there is no deflection of the galvanometer G of the detector for either position of switch FS whose function is later described. Any unbalance current flowing between the contacts CI and C2 traverses the primary P4 of the insulating transformer T4 whose secondary S4 is in the input circuit of a thermionic amplifier AM. The unbalance current, as amplified by the amplifier AM, is caused to traverse the movable coil 6 of the galvanometer G. The excitation for the field coil 7 of the galvanometer is derived from the secondary winding 3SC of transformer T3 whose primary P3 is connected to the source of test voltage or alternator A. The phase of the field excitation of galvanometer G can be shifted sufficiently for my purposes, approximately 90°, by throwing switch FS from one position to the other.

When the network is balanced, the phase difference between the current through and the voltage impressed upon the dielectric or insulator I is read directly from a scale, associated with slidewire SSI, calibrated in terms of power factor or equivalent; and the equivalent series capacitance of the insulator or dielectric I is read directly from a scale, associated with the slidewire SW2, calibrated in terms of capacitance or equivalent.

Figure 2:
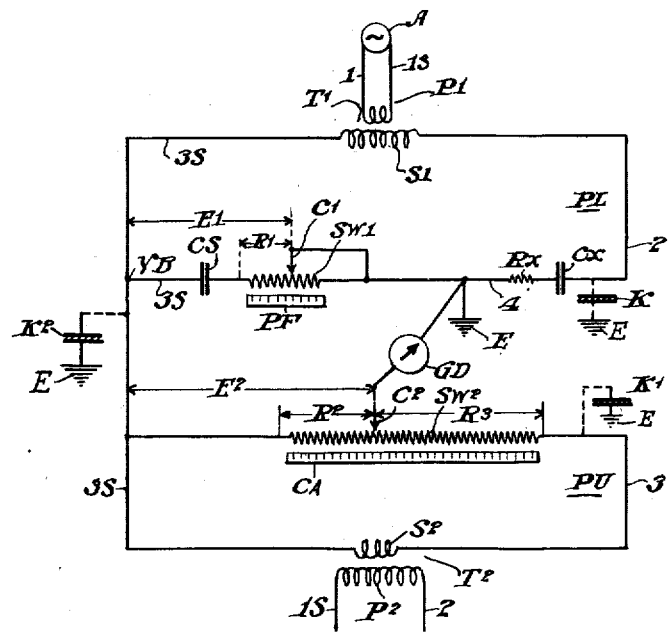
Fig. 2 is an elemental diagram illustrative of a measuring circuit utilizable generally in accordance with my invention, and particularly in accordance with Fig. 1 and other figures hereof.

Before further discussion of the system of Fig. 1, reference is made to Fig. 2 which shows, in simplified form, the potentiometer or measuring network. The high potential terminal of the secondary S1 is connected by conductor 2 to one terminal of a capacity CX, corresponding to the capacity between the bushing B of insulator I and the grounded frame, bracket or other structure H supporting the insulator; the resistance RX between capacity CX and earth is the series equivalent resistance of the dielectric of the insulator I between the bushing B and earth or casing H. Between the other terminal of the secondary S1 and earth are connected in series the fixed or standard capacity CS and the variable resistance SW1 whose other terminal is connected to earth. The effective portion of the resistance SW1 is identified as R1. The flow of current through the insulator I produces a voltage drop E1 which is the vector sum of the voltage drops across the condenser CS and the effective portion R1 of resistance SW1.

The variation of R1 has a negligible effect upon the magnitude of the current flowing in the upper branch PL of the network; it serves to permit shift of the phase of voltage drop E1 with respect to the output voltage of transformer T1 by altering that component of E1 which is in phase with the current through the specimen CX.

The branch PU of the potentiometer comprises or includes a slidewire SW2 whose opposite terminals are connected to the terminals of the secondary S2 of the step-down transformer T2. One terminal of the slidewire SW2 is connected to the condenser CS of the branch PL of the network, as contact C2 is adjusted to vary the ratio between the sections R2, R3 of slidewire SW2, the voltage difference E2 between contact C2 and the conductor 3S is varied.

Figure 3:
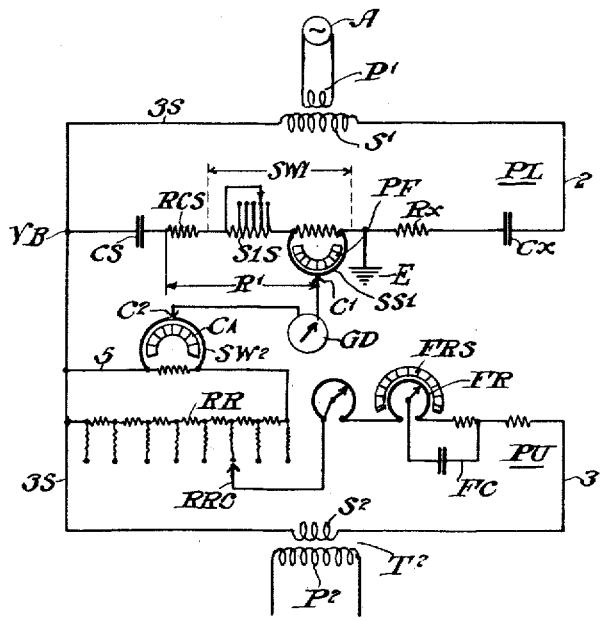
Fig. 3 is a diagrammatic view, including further details, of a measuring circuit or system utilizable generally in accordance with my invention, and particularly in accordance with Fig. 1 and other figures hereof.

In a particular system corresponding to Fig. 1, the transformation ratio of transformer T2 was selected to afford about 100 volts as the maximum value of E2, Figs. 2 and 3.

A detector GD, of any suitable type, is connected between the adjustable contact C1 of the branch PL and adjustable contact C2 of the branch PU. The two contacts are adjusted until the voltages E1 and E2 are in balance as determined by observation of the detector GD, which may be a vibration galvanometer, or preferably, as shown in Fig. 1, detector GD may be an alternating current galvanometer having a movable coil 6 energized by the unbalance current of the potentiometer system and a field coil 7 energized from the same source A that supplies the transformers T1 and T2.

When the potentiometer network is balanced, the power factor of the insulator I, or any other specimen under test, is expressed by the equation $$P.F. = 2\pi f \cdot CS \cdot R1$$

or more generally $$\cot \alpha = 2\pi f \cdot CS \cdot R1$$

where $f$ = frequency of source or alternator A, and $\alpha$ = phase angle between the output voltage of transformer T1 and the current in the branch PL of the network.

Since the only variable in this equation is the resistance R1, the slidewire SW1 may be provided with a scale PF calibrated directly in per cent power factor. If more than one frequency is used for test purposes, several scales may be provided, each calibrated for a particular test frequency.

The instrument actually measures the cotangent of the phase angle rather than the cosine of the angle (power factor), but for power factor up to about 10%, the cotangents and the cosines are numerically equal within tolerance limits; the scale readings are always correct in cotangent values so that corresponding cosine values (power factor) can be obtained from trigometric tables or curves.

When the network is balanced the capacity CX of the specimen, specifically insulator I, is expressed by the equation $$CX = \frac{CS \cdot R2}{TF \cdot (R2 + R3) - R2}$$

where TF = the transformation factor of the step-down potential transformer T2.

This equation is correct for the series equivalent capacitance of CX which is practically equal to its equivalent parallel capacitance for power factors up to about 10%. For higher power factors, the parallel capacitance, if desired, can be determined from well-known conversion tables. Accordingly, there may be associated with the contact C2 or movable element of the slidewire SW2, a scale CA readable in terms of the capacity of the specimen.

In actual test set-ups, the capacity to earth, of the conductor 2 and all high tension connections and apparatus connected thereto, provides a stray capacity K (Fig. 2) which is in shunt to the impedance of the specimen. Therefore, the displacement or charging current of the capacity K and its leakage current also flow through resistance R1 and CS of the network. The error due to this current may be avoided by providing the shield 2S for conductor 2 and shield 2SS for the high tension terminals of the transformers T1 and T2 and of the high tension connections between them, and by connecting these shields to each other and to the point VB of the network. With this shielding so connected, the charging current of the cable and the high tension terminals does not flow through the slidewire SW1 and condenser CS, the measuring impedance, and is therefore without effect upon the network; on the contrary, the shielding when so connected in effect transfers capacity K from its position of Fig. 2 to position across the terminals of secondary S1, so preventing charging current of capacity K from entering the measuring impedance.

Similarly, the charging current of stray capacity K1, the capacity of the conductor 3 and parts connected thereto to ground, would flow through condenser CS and resistance R1 except for provision of shield 3S connected to the point VB.

In general, the shields 1S, 2S, 3S, 2SS, as well as shields HT1, HT2, HT3 and HPU are all parts of a shielding system whose purpose is to confine any displacement current or leakage current fom the test source A or any of the transformer windings to a path or paths exclusive of the measuring impedances CS, R1. Any displacement or leakage current from conductor 1 to its shield 1S is merely a load on the source A, and any displacement or leakage current from conductor 3 to its shield 3S is merely a load on winding S2. In the absence of this low-tension shielding, there would be a tendency for displacement and leakage current to pass from the high voltage windings of transformers T1 and T2 through the low voltage circuits and then back to the low potential terminals of the high voltage windings S1, S2 through the measuring impedance.

Specifically, alternator A is isolated from ground as by the insulating material 9; one terminal of its armature winding is connected to shield AS, which may be the metal housing or frame of the generator, in turn connected to the sheath IS which encloses the conductor I from the other output terminal of the alternator. The sheath IS is connected to the metal casing HTI of the transformer TI and to the shield HT3 for the primary P3 of the transformer T3.

Enclosure of source A, lead I and the primary and secondary windings of transformer TI, within shields AS, IS, and HTI, respectively, all conductively connected to that terminal of the high tension secondary winding SI to which one terminal of the measuring means is connected, serves to exclude from the measuring means or network, whether or not the specimen be grounded, the charging current or currents occasioned by the source of test current; the shielding system aforesaid, or its equivalent, is so devised as to avoid need for shields for the primary PI and secondary SI, respectively, with connection of one of those shields to guard point or aforesaid terminal of winding SI and the other shield to earth if the specimen be grounded, and further avoids need for a shield between the aforesaid primary and secondary windings with connection thereof, whether or not the specimen be grounded, to earth or to the low tension or aforesaid terminal of the transformer secondary winding SI.

The grounded shield HTG, between the secondary windings 3SA, 3SB, 3SC of transformer T3 and the shield HT3, prevents any displacement or leakage current due to these secondary windings from returning to ground through the shield HT3, and hence through the condenser CS and resistance RI, the measuring impedance of the network.

The stray capacity between shielding HT3 of transformer T3 and the grounded shield HTG, is in parallel to capacity CS and resistance RI; the capacity is relatively small, for example, of the order of two thousand micro-microfarads; if the casing HP is made of metal and grounded there is also a small stray capacity between it and the casing HPU, also in shunt to the measuring impedance. Casing HP may be formed throughout of wood; preferably it may have a top plate of metal, which may be grounded to protect the operator. The stray capacities of the transformer casings HTI, HT2, and shielding sheaths 3S, IS, 2S and 2SS, to earth are also in shunt to condenser CS and resistance RI. The sum of these latter-named stray capacities so in shunt to the measuring impedance depends upon the proximity of the transformer casings and the shields 3S, 2S and IS to ground and to grounded structures such as transformer casings, switch casings, etc. The combined capacity of these elements to earth is many times greater than the stray capacity of the housing HT3 to earth, varying, for example, from about five thousand micro-microfarads to perhaps ten thousand micro-microfarads because in practice the conductors IS, 2S and 3S are covered with insulation and during tests may lie to greater or lesser extent upon the ground or grounded structures. While the principal part of this stray capacitance varies in an uncontrollable manner between wide limits, its effect in causing an error in the measurements is negligible because of the swamping magnitude of capacity CS.

The resultant of all the above-named stray capacities, illustrated in Fig. 2 as the capacity K2, is in shunt to the measuring impedance comprising capacity CS and resistance RI. Notwithstanding the magnitude of this capacity K2 is substantial and variable through a wide range, its effect upon the accuracy of the measurements is nevertheless negligible, because the chosen capacity of condenser CS is very great compared with the magnitude and variations of magnitude of capacity K2.

Specifically, the condenser CS may have a capacity of about 2.5 microfarads, (2,500,000 micro-microfarads), so that the error introduced by any variation of the stray capacity K2 is of the order of a few tenths of one per cent; because of this swamping magnitude of capacity CS, the measuring network is not, and need not be, specially calibrated or readjusted to compensate for the existence, or variation in magnitude, of capacity K2, of any of the aforesaid components of capacity K2 or of any other capacities directly or indirectly in parallel with, or otherwise related to, the aforesaid significant measuring impedance comprising capacity CS and resistance RI. Constancy of capacity K2 in shunt to the measuring impedance, and incidentally connected between guard point and ground, is a matter of indifference; there is no need for constancy of such capacity K2, and no need for a grounded shield or sheath for or about any of the shields connected to point VB or equivalent, as an expedient for ensuring constancy of capacity K2.

When tests are made in the field, the particular piece of apparatus, such as an oil switch or transformer, the qualities of whose dielectric are to be determined, is temporarily cut out of service but there are other conductors and/or pieces of apparatus in the more or less immediate vicinity which remain energized. Consequently there exist electrostatic and/or electromagnetic fields whose influence on the tests and measurements must be considered.

The shielding IS, 2S, 3S, 2SS, etc. does not protect the test apparatus from the influence of these electrostatic and electromagnetic fields from a disturbing source generically represented by F; this shielding is necessary whether the test be conducted where there is no disturbing field, or adjacent installed systems or apparatus which remain energized and produce a disturbing field at the service frequency during test of the specimen, and is necessary, whether or not one terminal of the dielectric of the specimen be grounded.

The system F represents generically any conductor or system causing a disturbing field, and generically represents a single two-phase or three-phase power, lighting or other system, at some place in which there is a definitely grounded point, or between an energized or electrically alive portion of which and ground there exists capacity; in either case the return current, so to speak, of disturbing frequency flowing between the shielding aforesaid and the disturbing source F is through such ground or capacity.

In the arrangement of Fig. 1, the high tension conductors F and step-down transformer TM remain energized during the test of insulator I, and their electrostatic and electromagnetic fields may have influence reaching to the insulator I and to the various components of the testing apparatus previously described. To avoid the effect of these fields, as of energized service conductors, upon the accuracy of the measurements, it is in accordance with my invention provided that the frequency of the current used for testing, that supplied by source A, shall be suitably different from the frequency of the disturbing high tension conductors and apparatus. Any suitable source of alternating current, or predominantly alternating or fluctuating current may be used, and source A specifically shown as a generator is generically illustrative of such a source.

Motor M, energized through the transformer TM from power line F, may be, for example, a self-starting repulsion induction motor having, for example, a centrifugal device to short-circuit the commutator when the rotor comes up to speed and having slots in the face of the rotor core providing definite poles causing the rotor to lock in at synchronous speed.

Any suitable provision may be made to insure that the output frequency of the source or alternator A shall be to suitable extent different from the frequency of any disturbing electrostatic or electromagnetic field; for example, the alternator A and motor M may have different numbers of poles; or, as indicated, a suitable speed changing mechanism SR may be interposed between the rotors of the motor M and generator A.

The difference between the test frequency, that of source A and the frequency of a disturbing field, need not be great; for example, when the disturbing frequency is sixty cycles per second, the usual frequency of power lines, the test frequency may be higher or lower by a difference, for example, of as little as five cycles. The permissible difference between the test and disturbing frequencies depends upon more or less close approximation to resonance with the test frequency of the natural frequency, mechanical or electrical, of a significant element or part of the measuring system. Mechanical resonance is obtainable for example by suitably choosing with respect to the test frequency the natural frequency of the moving system of a galvanometer; and electrical resonance with a test frequency is procurable at any suitable point in the measuring system by recourse there to a combination of inductance and capacity, series or parallel, resonant or substantially resonant to the test frequency.

For example, the natural frequency of the galvanometer or dynamometer, such as any of these herein described, may be one-twentieth to one-thirtieth of the beat frequency, which is the difference between the test and disturbing frequencies; for example, when the beat or difference frequency is ten cycles per second, a satisfactory period for the galvanometer, dynamometer or the like, may be about three seconds.

The purpose of mechanical or electrical resonance with the test frequency, above referred to, is to reject or exclude effects of disturbing frequency to extent sufficient to render them negligible upon the measurements or test to be made.

To render the measuring or testing system so substantially immune to currents of disturbing frequency any other suitable method or means may be employed; for example, a filter network or circuit may intervene at suitable point in the testing or measuring system as illustrated for example by Fig. 1E.

When a vibration galvanometer is used the difference between the chosen test frequency and the disturbing frequency may be as little as one-half cycle per second without appreciable effect upon the accuracy of the measurements. With the type galvanometer shown in Fig. 1 a test frequency very close to the disturbing frequency may be used as indicated in Fig. 1E, by connecting between the input of the amplifier AM and the contacts C1, C2 of slidewires SS1, SW2, a filter network FN whose constants are selected to pass the test frequency currents, and substantially to exclude from winding S4 currents of disturbing frequency. The network FN is a low-pass or a high-pass filter depending upon whether the test frequency is lower or higher than the disturbing frequency; or if desired it may be a band-pass filter suited to pass the test-frequency and not the disturbing frequency.

If desirable or necessary, a more elaborate combination of tuned circuits or filter sections may be used to attenuate currents of the disturbing frequency or selectively to pass current of the test frequency.

When the measuring network or the detector is of such character to permit use of a test frequency differing but slightly from the frequency of the disturbing induction from external sources, the generator A may be directly driven, without use of any change-speed mechanism, by an over-size induction motor; the slip of the motor will provide sufficient difference between the speeds of the motor and the generator to attain the desired end.

Since the principal value of the tests depends upon the detection of a significant change in the characteristics of the insulator with respect to time rather than in the determination at a particular time of its then characteristics at the service frequency, it is not essential that the test be made at the operating or service frequency and, in fact, a change in the properties of the dielectric may be more readily analyzed by using a test frequency substantially higher than the operating or power line frequency. Therefore, the frequency of the source A may be selected to be substantially higher than the operating frequency; for example, the test frequency may be 120 cycles per second for an insulator normally in service at 60 cycles.

When using a test frequency higher or lower than the disturbing frequency, and it may be very much higher or lower, it is desirable to avoid use of a frequency bearing a harmonic relation to the disturbing frequency.

When the disturbing electromagnetic or electrostatic field, within which the measurements are to be made, is that of a power line carrying current having a frequency of 60 cycles per second, the frequency of the source A may be 70 cycles per second, more or less. The frequency of source A may also be lower than that of the current of the power circuit or line, as for example, 55 or 50 cycles per second, or less, when the power line frequency is 60 cycles.

If desired, the motor-generator set M, A, or equivalent source of measuring or testing current, may be of a character to permit use of several different test or measuring frequencies; one of which may be approximately the same as the frequency of the disturbance-producing field and another of which may be substantially higher than the frequency of that disturbing field. Any suitable means may be provided to accomplish that purpose; for example, the change-speed mechanism SR may permit selection of different ratios of speeds of the motor and generator rotors. Another simple and satisfactory arrangement is to excite the alternator or generator field windings with three-phase current to provide a rotating magnetic field; when the generator armature is rotating in the same direction as its rotating magnetic field, the output frequency of the generator is lower than when its field and armature are rotating in opposite directions. To give a specific example, assume a ratio of 11 to 6 of the speeds of the alternator A and the motor M which would result in a test frequency of 110 cycles per second if the alternator field were excited with direct current and the motor supplied with 60 cycle current. When the generator armature and its rotating magnetic field are rotating in the same direction, the test frequency is 50 cycles; when they are rotating in opposite directions, the test frequency is 170 cycles. The reversal can most conveniently be effected by reversing the direction of rotation of the rotating field excitation of the alternator. The measuring apparatus is calibrated for use at the chosen test frequencies, if other than comparative measuring apparatus is calibrated for use at the chosen test frequencies, if other comparative measurements are desired. Since the output voltage of the generator is different for the two frequencies, suitable provision is then made to provide that the voltage as applied to the transformers T1, T2 and T3 shall be the same at both frequencies. To that end any suitable voltage-changing device, as an auto-transformer, may be interposed between the alternator and the transformers.

The use of a test frequency different from the frequency of the disturbing field avoids need for double shielding of conductor 2 in particular, and in general of the high tension connections and apparatus associated therewith; that is, shielding, in addition to shielding 1S, 2S, 3S, 2SS, etc., and which generally is connected to ground, is not required or employed to divert from the measuring impedance currents produced in the test apparatus by some external source F. Use of such different test frequency makes it possible to make direct measurements and readings without recourse to reversing the phase of the test current and averaging of measurements. Furthermore the accuracy of the measurements is not affected by unsteadiness or fluctuations in amplitude of the electrostatic and electromagnetic fields of the external source of disturbance.

When tests are made in a test room or laboratory, and in general in the absence of disturbing electrostatic or electromagnetic fields, the test frequency used may, if desired, be the same as the frequency of the system in which the specimen in its normal use is included.

Where the dielectric or specimen under test or measurement is exposed, during test or measurement, to a disturbing electromagnetic and/or electrostatic field, there passes through the dielectric or specimen and the measuring apparatus or system a current of frequency corresponding with that of the disturbing field or fields. The effect of such current upon the measuring system is, in accordance with my invention, avoided, by use of a test frequency which is different from that of the disturbing field or fields, and by providing in the measuring system means rendering it immune to effect by the simultaneously present disturbing frequency.

In practically all cases, one side of the motor supply source, generically represented by transformer TM, is grounded. In the event the source is not so grounded, either one side of the circuit should be grounded or else there may be interposed between the source and motor M a transformer, one terminal of whose secondary winding for supplying current to motor M, should be grounded as a matter of safety to the operator. For further safety to the operator, all metal parts, by him likely or necessarily to be touched directly or through moderate insulation, are definitely grounded, as by connecting them to grounded top plates of units MU and D.

With the connections shown, if the lead 4a becomes for any reason disconnected from ground or from the grounded plate of the measuring apparatus, the motor circuit is interrupted.

The ground lead 4a carries the motor current and hence has in it a substantial fall of potential at the disturbing frequency. Were this lead also used to conduct the test frequency current to the measuring network it would therefore introduce a disturbing voltage into that network. Hence the lead 4, separate and distinct from lead 4a, is provided to connect the network to ground. For convenience, the leads 4 and 4a may have a common clip k for connecting them to ground or to the grounded structure H.

It is also desirable, from the standpoint of safety to the operator, to provide a safety-gap GS, such as a neon-tube, between the sheath or shield 3S, or other point of the same potential, and the conductor 4 or ground; so that in event of breakdown of the specimen, the sheaths 3S, 1S etc. cannot acquire a dangerously high voltage with respect to earth.

Particularly to protect the apparatus from high or radio frequency voltages generated, as by an arc due to incomplete failure in the high-voltage test circuit, as in the specimen, there is preferably provided a small air-gap AG, Fig. 1, shunted by a condenser AC of about 2000 micro-microfarads, for example, which is connected between the shield 2SS and ground. In general, the airgap is disposed as near as possible to the high-voltage source, and the lead therefrom to earth is made as short as possible. While the aforesaid condenser AC is in parallel with the measuring apparatus, or, in general, in parallel with the significant impedance CS R1 of the measuring system, its aforesaid magnitude is such that it is in effect comprised in the capacity K2, and therefore AC, together with the stray or other components of capacity K2, is swamped by the large capacity CS; whether or not capacity AC be utilized, the capacity CS swamps all of the incidental or stray capacities represented generically by K2.

The apparatus of Fig. 1 is not restricted in its use to measurement of the power factor and/or capacitance of transformer or switch insulators; it is suited for the determination of the power factor and capacitance of any dielectric specimen whose electrical characteristics may be approximately represented, as indicated in Fig. 1A, by a substantially pure capacity with either or both of parallel resistance RX and series resistance RY. However, whatever may be the complex of capacitance and resistance of the specimen, the quantities measured, in accordance with Figs. 1–3 and the like, are the equivalent series capacitance of the specimen and its power factor. The measuring apparatus in fact functions properly when the capacitance component CX is very small, the current in the high-voltage circuit then being almost entirely conductance current, and also when the conductance RX is very small, the current in the high-voltage circuit, then being almost entirely capacitance current.

For example, the apparatus may be used to measure the power factor and capacitance of high tension cable, installed or otherwise. To test the cable of Fig. 1B, one or more of the cable conductors, as conductor CC, is connected to conductor 2 of Fig. 1, and the cable sheath CH, if the cable has not been installed, is grounded. The sheath of an installed cable is of course already grounded.

Similarly, the apparatus of Fig. 1 may be used to measure the dielectric properties of the oil used in a transformer or switch; for example, as shown in Fig. 1C, a sample of the oil is disposed in a cell OS of insulating material having two metal plates 10 and 11 which are insulated from each other and immersed in the oil. One of these plates may be connected to earth and the other to the conductor 2 of Fig. 1; but whether or not one terminal or plate of the test cell be grounded, the shielding system comprising 1S, 2S, 3S, HT1, HT2, AS, HPU, HT3, is effective to prevent charging currents, due to the source of testing current, or their effects from influencing the measurements. Grounding of a terminal of the specimen or test cell is a matter of indifference insofar as accuracy of measurements is concerned. Whether the specimen Cx be grounded or not, use of an outer grounded shielding system, for or about the aforesaid shielded leads and/or the components of the measuring network, is not necessary either to divert from the measuring apparatus currents due to the source F of external disturbance or to provide for constancy of capacity such as K2, Fig. 2, in shunt to the measuring impedance and/or between guard point VB and ground; in fact, without adverse effect upon the accuracy of the measurements, the currents due to source F are not diverted from the measuring impedance, and the magnitude of capacity K2 may, because of large capacity of CS, vary widely without need for any compensation. Reverting to Fig. 1C, the spacing and area of the plates 10, 11, and other constants of the cell OS being known, the dielectric properties of the oil are directly determined from the readings obtained when the network is balanced as above described.

To prevent error due to leakage along the walls of the cell OS, an adaption of the Price guard-ring may be used as shown at GR, preferably both on the inside and outside thereof near the ground connection, and connected to sheath 2S. To avoid stray capacitance errors at the cell, the cell unit may be mounted in a metal box connected to shield 2S and provided with small openings for the high voltage lead 2 and the ground lead.

Figs. 1 and 1B illustrate the use of a guard-ring GR when the test specimens are respectively an insulator and the dielectric of a cable.

For determination of the properties of the oil, the readings are preferably taken at a substantially lower voltage than generally used to measure the power factor and capacity of solid dielectrics or insulators I; for example, the test voltage for the oil cell OS is of the order of 1500 volts, whereas the test voltage for solid dielectrics or insulators I is of the order of 10,000 volts or substantially higher. The test voltage may be reduced by any suitable means; for example, by interposing a voltage-reducing auto-transformer in circuit between the alternator A and the primary of the step-up transformer T1 beyond the connections between the source A and the supply transformer T3 of the detector unit D. Specifically, as shown in Fig. 1D, the cable 1, 1S may be provided in sections with plug and socket connections so that the conductor 1 and shield 1S of the sections may be interconnected to provide a direct connection between the alternator and transformer T1, as shown in Fig. 1, or, as in Fig. 1D, the sections may be separated, one section connecting to the primary, and the other to the secondary of the auto-transformer AT, whereby the auto-transformer intervenes between source A and transformer T1. The casing or housing HAT of the auto-transformer connects to the sheath 1S of both sections of the cable. The interposition of the auto-transformer AT not only reduces the voltage applied to the oil specimen, but also, and correspondingly, the voltage supplied to the network PU of the potentiometer.

The difference in the voltage applied to the potential transformer T2, when employing the auto-transformer, may cause a shift in the phase angle of the electromotive force with respect to the current supplied to the branch PU of the network; to correct for this phase shift in transformer T2 there is provided a capacity FC and resistance FR with whose adjustable element may be associated a scale (FRS, Fig. 3) calibrated for example in terms of the test voltage.

If the measuring apparatus is always to be used at a fixed test voltage, the resistance FR is set to correct for the phase-shift of the particular potential transformer T2 of that voltage, and is not changed except when transformer T2 is replaced by another having different inherent phase-angle. Because of the aforesaid swamping magnitude of capacity CS, it is not necessary to readjust resistance FR to compensate for variations in magnitude of capacity K2, Fig. 2, which, as aforesaid, predominantly consists of stray capacities whose magnitudes vary in unpredictable manner for different test locations, with change in position of leads 1S, 2S, 3S, and for different spacings of the transformers T1, T2, with respect to ground or grounded structures.

Because the uses to which the apparatus may be put are numerous, it is desirable, instead of using a simple slidewire SW2 as in Fig. 2, to shunt the slidewire SW2 by a suitable range changing device such as a compensated Ayrton shunt RR permitting change in the voltage drop across SW2 without changing the current supplied by transformer T2 and without shifting the phase of voltage E2 (Fig. 2). The switch points for the shunt may be marked, or a scale may be associated with the switch RRC, to identify the factor by which the readings of the slidewire SW2 shall be multiplied. Furthermore, as shown in Fig. 3, instead of using a single slidewire SW1 in the branch PL of the network, it is desirable, because the power factor readings will be usually 10% or less, to divide the slidewire SW1 of Fig. 2, into two variable resistances S1S and SS1, and to associate the movable contact C1 with slidewire SS1 whose maximum resistance is small compared to the sum of the resistances SS1, RCS and slidewire S1S. The relative magnitudes of the resistances may be such, for example, that the range of the scale associated with the slidewire SS1 may be from zero to 10% power factor. A second scale may be associated with the resistance S1S of the step-by-step type and whose dial is calibrated in cotangent values; for example, the change in position of the dial from one resistance tap to the next corresponds with a change in magnitude of the cotangent of 0.1 for the range from 0.1 to 1.0, the maximum corresponding to about 71% power factor.

Because of the large capacity required for the standard condenser CS, it is impractical to use an air-condenser. It is not difficult, however, to obtain mica condensers, for example, having a small and constant phase angle within the range of from zero to five minutes. Consequently, the calibration may be based upon use of a standard condenser having a phase angle of five minutes, and if the condenser CS actually used in a particular measuring unit has a smaller phase angle, compensation for the difference can be effected by including a resistance RCS of suitable magnitude. With this arrangement the phase angle of condenser CS is effectively zero.

Figure 4:
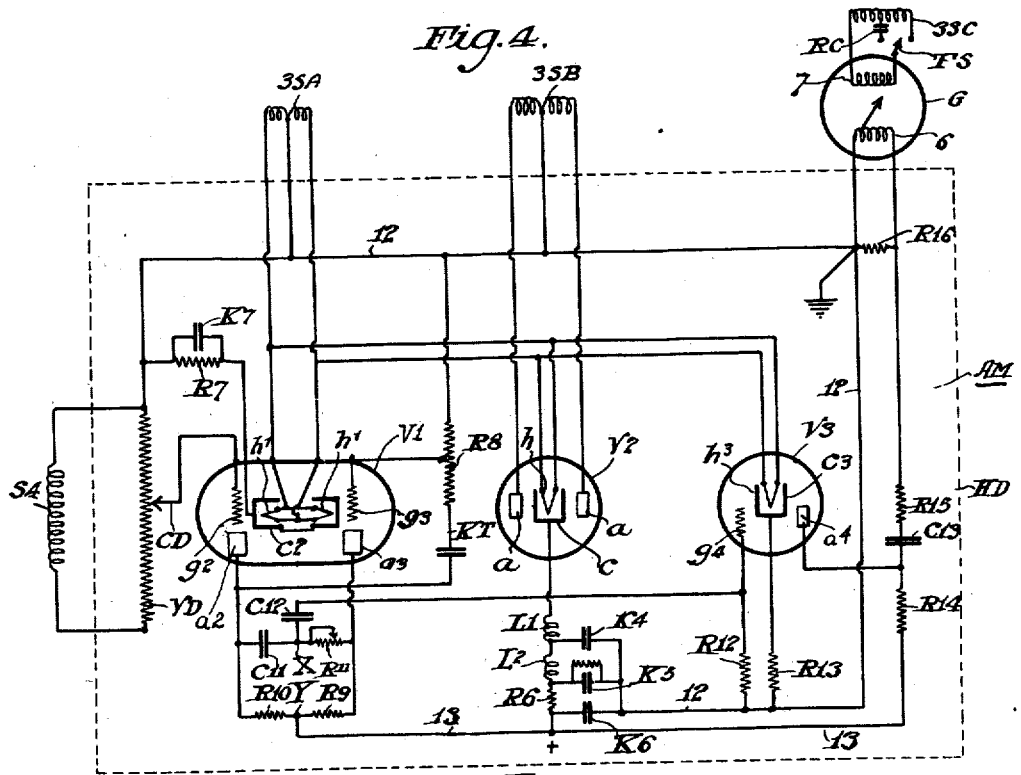
Fig. 4 is a diagrammatic view of a detector system utilizable as a component of dielectric measuring or testing systems.

The amplifier AM of Fig. 1 is shown in detail in Fig. 4. The rectifier tube V2 for supplying the anode current to the tubes V1 and V3 may be a double-wave rectifier having its anodes $a$, $a$ connected to the terminals of the transformer secondary 3SB whose center-tap is connected to the conductor 12. The heater $h$ of tube V2 is supplied with current from the secondary 3SA whose center-tap is also connected to conductor 12. This same transformer winding also supplies current to the heaters $h1$ and $h3$ of tubes V1 and V3. The cathode $c$ of the rectifier is connected to the filter network comprising the inductance L1, L2, resistance R6 and condensers K4, K5 and K6. The positive terminal of the filter network is connected to the conductor 13, and the other side of the network is connected to conductor 12.

The grid $g2$ of amplifier or repeater tube V1 is connected to the contact CD adjustable along the resistance VD in shunt to the secondary S4 of the transformer T4 which couples the detector unit to the measuring network. The cathode $c2$ of tube V1 is connected to the conductor 12 through the grid biasing resistance R7 which is shunted by a by-pass condenser K7 of suitably large magnitude, as 25 microfarads.

The anode $a2$ associated with grid $g2$ of tube V1 is connected through condenser K7 to one terminal of a resistance R8 whose other terminal is connected to the conductor 12. The grid $g3$ of tube V1 is connected to a suitable point intermediate the terminals of voltage dividing resistance R8. The anode $a3$ of tube V1 is connected to conductor 13 through resistance R9 and anode $a2$ is connected to conductor 13 through the resistance R10. Between the anodes $a2$ and $a3$ of tube V1 are connected in series the condenser C11 and adjustable resistance R11.

When the measuring network is unbalanced and current flows through the primary P4 of transformer T4, there is produced an alternating difference of potential between the points X, Y in the output circuit of the tube V1. The phase relation between this alternating difference of potential and the current in field winding 7 of the galvanometer G may continuously be varied, preferably through an angle greater than 90°, by adjustment of resistance R11 for a purpose hereinafter explained. The adjustment does not appreciably vary the magnitude of the alternating difference of potential between points X, Y which is determined by the extent of unbalance of the potentiometer network and the setting of the gain-control contact CD.

The potential at point X is impressed through the blocking condenser C12 upon the grid $g4$ of amplifier tube V3 connected to conductor 12 through the grid leak R12. The cathode $c3$ of tube V3 is connected to conductor 12 through the biasing resistance R13. The anode $a4$ of tube V3 is connected through the resistance R14 with conductor 13, and to one terminal of the movable coil 6 of the galvanometer G through the blocking condenser C13 and resistance R15. The other terminal of the movable coil 6 of the galvanometer is connected to conductor 12 which, as indicated, may be grounded. If desirable or necessary, a resistance R16 may be connected across the movable coil of the galvanometer for damping it.

The manner in which the phase shifting network R9, R10, condenser C11 and adjustable resistance R11 facilitates balancing of the potentiometer network is as follows: The contact C2 associated with capacitance scale CA of the potentiometer network is adjusted to give a large unbalanced current in the galvanometer. The resistance R11 is then adjusted until there is no deflection of galvanometer G. This is not indicative of balance of the measuring network, but simply that the current in the coil 6 representative of the unbalance current of the network, is in quadrature with the field excitation of the galvanometer. The switch FS is then thrown to its other position to produce a 90° phase shift of the field current of the galvanometer. The galvanometer now has a maximum sensitivity for the capacitance unbalance of the measuring network and minimum sensitivity for the conductance or resistance unbalance of the network. The contact C2 of slidewire SW2 of the potentiometer is now adjusted to give a null or minimum deflection of galvanometer G. The capacitance setting of contact C2 made under these conditions is very nearly the setting for the true magnitude of the capacitance of the specimen CX, representing I of Fig. 1. Having balanced the measuring network for the quadrature component of the current through the specimen CX, the galvanometer field switch FS is returned to its former position, and contact C1 of the measuring network is adjusted to give a null or minimum deflection of galvanometer G. This adjustment balances the measuring circuit for the inphase or conductance component of the current, through specimen CX, or other specimen under test.

To obtain a perfect balance, it may be necessary again to repeat the foregoing adjustments of C2 and C1, so that or until the galvanometer G does not deflect for either position of the switch FS. Null response of the galvanometer for both positions of switch FS is an accurate indication and proof of actual zero current through the transformer winding P4, connoting true and final balance of the measuring network, for which the power factor and capacitance of the specimen are then readable from scales PF and CA.

Once true balance is obtained, the magnitude of resistance R11 is immaterial. The principal advantage of the phase-shifting system, including resistance R11, is that it permits the inphase and quadrature components of the unbalanced current of the measuring network to be balanced substantially independently of each other. Except for the provision of such an arrangement, use of an ordinary detector, such as a telephone receiver or vibration galvanometer, either of which responds to any unbalanced current regardless of its phase, would require adjustment of both slidewires SW1 and SW2 for a balance, since a null galvanometer indication is obtainable only when both inphase and quadrature conditions of balance are simultaneously satisfied. It is often a tedious process to find the true balance point in this latter case.

The continuous phase shift, afforded by resistor R11, condenser C11 and resistors R9 and R10, is introduced into the input system of the movable coil 6 of the galvanometer between two vacuum tubes where the impedance is high; consequently small and inexpensive resistance and capacity units may be used. Because the elements of this phase-shifting system are small, their fields have negligible effect upon the galvanometer. Furthermore, the adjustment of resistor R11 does not appreciably alter the gain or selectivity of the detector system as a whole.

The gain-control VD is introduced at a point in the system where its adjustment does not appreciably affect the phase of the current in the movable coil 6 of the galvanometer and so does not affect the setting of resistance R11.

The 90° phase shift, of the current in the field coil of the galvanometer, controlled by switch FS, is obtained by procuring resonance of the field coil 7 with condenser RC for inphase field excitation at the test frequency; and, by excluding the resonating condenser RC, quadrature excitation is procured. For that position of switch FS for which condenser RC is included in circuit, the voltage impressed by secondary 3SC on the circuit is reduced, since condenser RC connects to an intermediate tap on secondary 3SC. The current in the field circuit is thus limited under the resonant condition to a safe value without recourse to dissipating resistors of substantial wattage rating and substantial physical dimensions. This 90° phase shifter is inexpensive and so compact that it may be included directly in the detector unit without producing errors due to influence of stray fields upon the sensitive galvanometer.

While, as aforesaid, when the measurements or tests are made within a disturbing electrostatic and/or magnetic field, there appears in the measuring network, flowing through the significant measuring impedance CS, R1, a current of the frequency of the disturbing field or fields, and while such current of disturbing frequency appears in the coil 6 of the galvanometer G, the disturbing frequency is rendered of no effect upon the galvanometer and measurements dependent thereon because the galvanometer field 7 is excited with current at the test frequency only, with the result the test frequency current in the field coil 7 and the current of disturbing frequency in the movable coil 6 have no effect insofar as producing a torque or deflection of the galvanometer coil.

The mode of operation of the apparatus shown in Figs. 1-4, inclusive, and in general the mode of operation of the other systems herein described, is as follows:

Assuming the test or measurement of the dielectric specimen is made beyond influence of a disturbing electromagnetic and/or electrostatic field, the output frequency of the source A of test current may be anything suitable or desirable, and need not be related to the frequency of the current, of a power line or other circuit, which would be disturbing if the measurement were made within its field.

The test lead or conductor 2 is connected to any metal part in contact with the dielectric at a region sufficiently remote from the earth connection or earthed plate to afford a fair sample of the material under test. In Fig. 1 the conductor 2, a part of the measuring set, is connected to the bushing B, and the plate H or equivalent is connected to earth E. The leads 4a and 4b are clipped or connected to the shield HP of the measuring unit, and at k leads 4 and 4a are clipped to earth or plate H or equivalent. The motor M is energized, as through transformer TM, connected to power line F, which under the conditions assumed, either has no disturbing field effect upon the test apparatus or is of a frequency different from the test frequency to the extent and for the purposes herein described. The source A applies current at test frequency through transformer T1 to the specimen I, and the current flowing through the latter passes through the conductor 4 and through the measuring impedance CS and R1, with return through the point VB, shields HPU and 3S to the case HT1 and the low potential terminal of the secondary S1 whose high potential terminal connects to aforesaid conductor 2. The primary P2 of the voltage or potential transformer T2 is connected in parallel with the secondary S1 of transformer T1, and through the secondary S2 impresses through the conductor 3, within shield 3S, a current through resistance or slidewire SW2 to the point VB and thence to case HT2 and the low tension side of the secondary S2. The correct phase relation of this current is first determined, as hereinbefore described, by adjustment of the phase-shifting resistance FR, Figs. 1 and 3. Now to effect balance of the measuring network, and so to procure readings of power factor and capacitance of the specimen, the contacts C1 and C2 of slidewires SS1 and SW2 are so set relatively to each other that, for either position of the galvanometer switch FS, the moving coil 6 of the galvanometer G does not deflect connoting nil current through coil 6 and balance of the network. These positions of the contacts C1 and C2 are their final ones; promptness of their correct settings is facilitated by first adjusting the resistance R11 as above described in connection with Fig. 4. Now the power factor and capacitance of the dielectric specimen, such as I, is immediately and directly readable from the scales PF and CA, Figs. 2 and 3, associated respectively with the slidewires SW1 and SW2, Fig. 2, and respectively with the slidewires SS1 and SW2 of Figs. 1 and 3.

From the power factor or cotangent values, together with the capacitance values, there may be determined other quantities, magnitudes or characteristics regarding the dielectric or specimen, such as the conductance or the impedance, and if the applied voltage is known, there may also be determined the current through the specimen or dielectric and the energy dissipation therein, all in accord with known and established relations.

Figure 5:
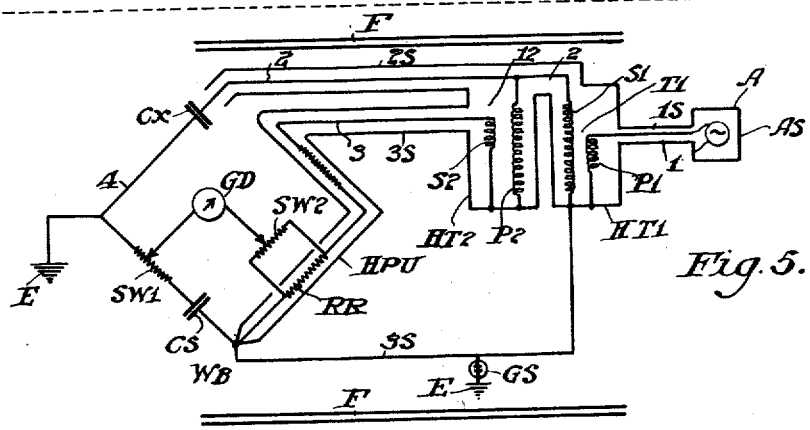
Fig. 5 is a diagrammatic view of the significant components of a system such as Fig. 1 or equivalent system, redrawn in form of a bridge.

Although in the analysis and design of the measuring network it is simpler to consider it as a potentiometer, it may also be treated as a bridge circuit in making the computations necessary to determine the constants of the various impedances. In Fig. 5, the measuring network is in form an alternating current Wheatstone bridge; all components have been identified by the same reference characters used in preceding figures.

Figure 6:
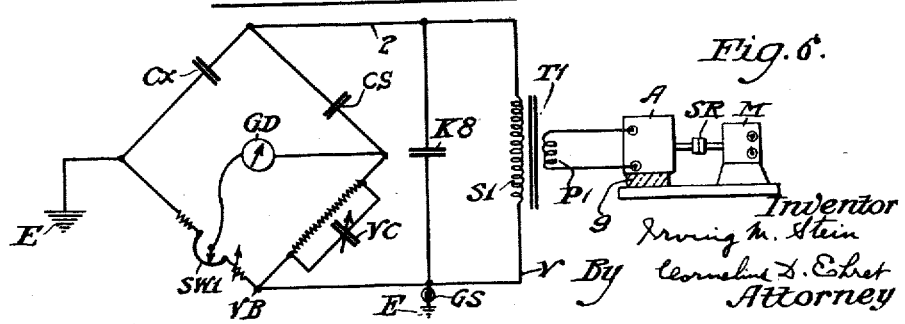
Fig. 6 is a diagrammatic view of a modified bridge circuit utilizable in accordance with my invention.

The invention may also be utilized with the alternating current bridge network shown in Fig. 6, in which the grounded specimen CX under test, such as the insulator of Fig. 1, the cable of Fig. 1B, the oil cell of Fig. 1C or any other dielectric, is included in one arm of the bridge; in an adjacent arm of the bridge is included a standard condenser CS which in this modification may be a small air-condenser. The junction of these two arms of the bridge is connected through conductor 2 to one terminal of the secondary S1 of the step-up transformer T1. The arm of the bridge including the slidewire SW1 is connected at one end to earth E and at its other end to the other or low potential terminal V of the step-up transformer T1. The fourth arm of the bridge, including the variable condenser VC, is connected between the standard condenser CS and the slidewire SW1. Any suitable detector GD, as a galvanometer is connected between the standard condenser CS and the adjustable contact of the slidewire SW1.

Since the conductor and all the high tension parts and connections associated therewith have capacity to ground, and are at potentials substantially higher than ground, a substantial displacement or charging current tends to flow through the arm of the bridge including the slidewire SW1. The error due to this charging current is avoided by shielding all the high tension connections in the apparatus and connecting the shield to the point VB of the bridge; which is at the potential of terminal V. The stray capacity and stray conductance of all the high tension parts is represented by the condenser K8 connected between the high tension conductor 2 and the point VB of the bridge. By virtue of this connection of the shielding to point VB the charging current of the high tension parts flows in a path which is external to the bridge. Hence, the charging current of the shield system, as in the case of the shield system of Fig. 1, does not affect the balance point of the network or the accuracy and reliability of the readings.

As in the preceding modification, the test frequency supplied by the source A, Figs. 5 and 6, is made different from the frequency of any disturbing field or fields. Therefore, electrostatic and electromagnetic induction from high tension conductors or apparatus remaining energized at service frequency in the vicinity of the testing apparatus and specimen does not affect the accuracy or reliability of the measurements.

Referring to Fig. 7, the test system shown is that of Fig. 1, except for addition of the step-up transformer T5. The insulator I is, in this case, one which isolates, when in service, the lead WL which passes through the insulator I to the winding W of a transformer. Were it attempted to take the measurements regarding transformer insulator I with the system shown in Fig. 1, the capacity and power factor readings would not be those of impedance CX solely, because of the existence of the capacity WC between the transformer winding W and the transformer casing H. To avoid the effect of the capacity WC upon the measurements, without need to disconnect transformer winding W from its lead WL and without need to drain off the transformer oil, the lead WL is connected to a source of auxiliary potential which is equal at all instants to the potential applied to the bushing B. Specifically, the lead WL is connected to the conductor 14 extending to the high tension terminal of the secondary S5 of transformer T5. The other terminal of the secondary winding S5 is connected by conductor 15 to the same clip k used to connect the conductors 4 and 4a to the transformer casing H or ground E.

The primary winding P5 of the transformer is connected by conductors 1 and 1S, the latter serving as a shield for the former, to the source A. The voltage applied to the lead WL being the same as that applied to the bushing B, there is no potential difference across the capacity BL existing between these elements, consequently no current flows through this capacity. The current from the secondary S5 which passes through the capacity WC, the capacity of the transformer winding W to earth, returns directly to the grounded case HT5 of transformer T5 as indicated, and does not flow through the measuring circuit.

The high voltage lead 14 is enclosed by the shield 14S, so that any displacement current therefrom flows directly to the grounded terminal of secondary S5 and cannot flow through the measuring network. To maintain the isolated condition of conductor 1, the primary winding P5 of the transformer T5 is enclosed in the shield PS connected to shield 1S.

The system of Fig. 7 is not restricted in its use to the measurement of the power factor and capacitance of transformer bushings; it is also suited to measure the power factor and capacity of any impedance, as of a dielectric, having the relation of CX, Fig. 7A, in a combination of several impedances which conveniently cannot be dissociated; for example, it may be used to measure the power factor and capacity, or to determine energy losses, in a multi-conductor cable, such as shown in Fig. 7B, in which the significant distributed or stray capacities between the cable conductors themselves, and between the conductors and the sheath are identified by the same reference characters used in Fig. 7A. To determine the energy loss between a particular conductor and the sheath, that conductor is connected to cable 2 from the step-up transformer T1, and the other conductor is connected by conductor 14 to the step-up transformer T5, exactly as shown in Fig. 7. When there are more than two conductors in the cable, the energy loss between an individual conductor and the sheath can be determined by connecting that cable conductor to conductor 2, and by connecting all the remaining conductors to the lead 14.

As in the preceding modifications, when the tests are made on installed apparatus in the presence of fields of disturbing frequency of high tension conductors or of apparatus which are not or cannot be cut out of service during the tests, the source A, supplying a test or measuring frequency different from the disturbing frequency, insures, as herein described, that the measurements shall not be affected by the disturbing fields.

The system shown in Fig. 8 is also suitable for measuring the power factor and capacitance of a transformer insulator I without need to disconnect the transformer winding W from its lead WL. This arrangement does not include an auxiliary transformer such as T5 in Fig. 7; it may utilize the same arrangement as shown in Fig. 1, the only difference being that, as indicated, the shield 2S for the conductor 2 is connected to the winding lead WL. This arrangement is suitable when the insulation between the lead WL and bushing B is capable of withstanding the output voltage of the high tension transformer T1.

As may be seen more clearly from Fig. 8A, the charging current for the capacity BL, between the bushing B and the lead WL, passes directly from lead WL to the sheath 2S, and does not traverse the measuring circuit. With this connection, the capacitance WC is subjected to low voltage, for example, of the order of one volt, and is in parallel with the condenser CS and resistance R1, the measuring impedance. However, even though this capacity WC may be several thousand micro-microfarads, it does not materially affect the accuracy of measurement because, as above pointed out, the capacitance CS in the measuring circuit effectively in shunt to WC is of the order of 2.5 microfarads; hence the error due to capacity WC is of the order of less than one per cent.

In the modification shown in Fig. 9, the arrangement is essentially the same as that of Fig. 1 except that the sheath 2S is connected to ground. The charging current between the high tension parts and the shielding or other grounded structure traverses the measuring impedance comprising resistance RI and the capacity CS. To prevent error due to this charging current, there is provided an auxiliary step-up transformer T6 energized from the source A, or other common supply source for the transformers. One terminal of the high tension secondary winding S6 is grounded and the other terminal is connected to a conductor 16 enclosed in a shield 17 which is connected by conductor 18 to the point VB of the measuring network. The transformer secondary S6 is so poled that the charging current between conductor 16 and shield 17 traverses the resistance RI and condenser CS of the measuring network in opposition to the charging current between the conductor 2 and its sheath 2S. The constants of the unit comprising conductor 16 and shield 17 are so selected that its charging current is approximately equal in magnitude and like in phase, to the charging current of the unit 2, 2S.

In making a test, the switch HS is at first open so that only the charging currents of the two units 2, 2S and 16, 17 traverse the measuring impedance; the resistance R17 and/or condenser C17 are then adjusted to shift the magnitude and phase of the charging current of the unit 2, 2S until there is no indication by the detector GD for any position of the adjustable contact within branch PL, the measuring network. The switch HS is then closed and the determination of power factor and capacitance of the specimen CX determined as previously described.

Instead of using the second unit to neutralize the effect of the charging current of the unit 2S, 2, there may be used an equivalent combination of resistance and capacity, such as shown in Fig. 9A, in which the capacity of condenser C18, the resistance of resistor R18, and the voltage ratio of transformer T6 are so related that the current from transformer T6 is equal in magnitude and opposite in phase to that of the charging and leakage current to ground of the high tension parts associated with transformer T1. If condenser C18 and resistance R18 are variable, the resistance R17 and condenser C17 may be omitted, and shield 2S connected directly to ground.

In Figs. 9 and 9A it is also advisable to provide a current source A whose frequency is suitably different from the frequency of external disturbing fields because even though the conductor 2 is shielded and the shield 2S grounded, it is nevertheless usually practically impossible to shield the specimen itself against strong disturbing fields; use of a test frequency differing from a disturbing frequency is effective with regard to both electromagnetic as well as electrostatic disturbing fields.

Figure 10:
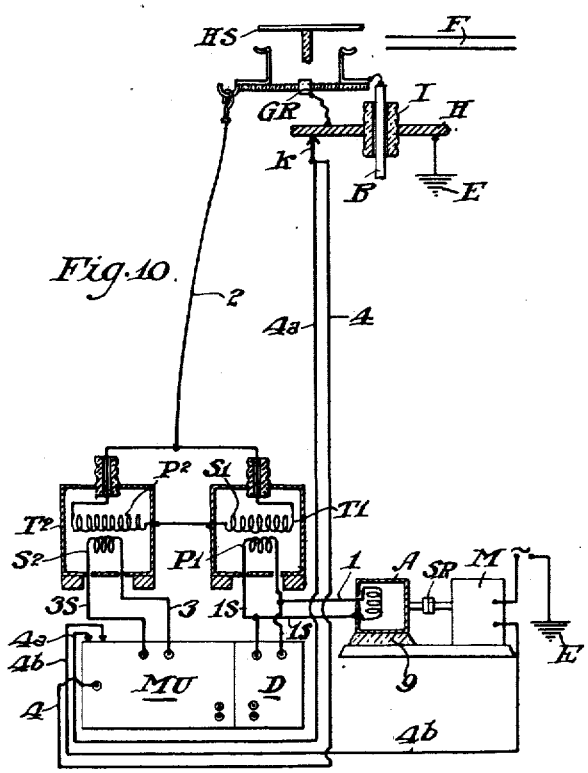
Fig. 10 is a diagrammatic view of a further system in accordance with my invention.

In the modification shown in Fig. 10, which is generally similar to that of Fig. 1, all shielding of the cables or leads may be omitted. The charging current to earth from the conductor 2, and all other high and low tension conductors, flows through the measuring apparatus. To determine the energy losses through the specimen I, two readings are taken, one with the switch HS closed and one with the switch HS open. From the difference between the readings is determined the power factor, capacitance, current and energy losses of and in the specimen.

When a switch such as HS is used in this or in Fig. 8, it is desirable to use a guard structure GR, like a guard ring, which is connected to ground, or some structure at ground potential.

Although the apparatus is substantially unshielded, no appreciable errors due to the disposition of the test apparatus in the vicinity of strong electromagnetic and electrostatic fields will result, because as in the preceding modifications the source A provides a test frequency which is suitably different from the disturbing frequency, such as that of power line F.

With this, as in the other arrangements, because of the provision of a test frequency suitably different from the disturbing frequency, there is no need to reverse the phase of the current to transformers T1 and T2 and to take the average of the two sets of readings, to correct for the influence of disturbing fields. Neither the strength nor variations in strength of disturbing electrostatic and electromagnetic fields affect the measurements even though the apparatus is substantially unshielded.

Fig. 11 is substantially the same as Fig. 1 and shows a voltage regulating unit such as an auto-transformer AT in circuit between the source A and the transformer T1. In this figure, the bushing of lead-in conductor B of the specimen I is shown as connected by conductor 20 to one side of the disconnect switch DS which normally connects it to the power line F. To test the insulator I, the disconnect switch is opened, but the movable contact structure of the switch and the lead 20 from the switch to the lead-in B of insulator I remain in the vicinity of the charged line F. After the switch DS is opened, the conductor 2 of the test set is connected to the lead-in B of the insulator. Notwithstanding the close proximity of the switch DS and conductor 20 to the charged conductor F, there is no error introduced into the measurement, because the test frequency supplied by the alternator A, or equivalent, is suitably different from the disturbing frequency of the current in conductor F. In the particular set-up shown, the insulator I is in parallel to the insulator IS insofar as the test current is concerned. If the readings for this same combination of insulators show a significant change over a period of time, it then becomes advisable to make a separate test for the insulator I after removal of conductor 20.

In all modifications previously described, the measuring system has been of the type using a balanceable network, such as a potentiometer or bridge. My invention, however, is also suited for other types of measuring apparatus.

Figures 12, 13, 13A, 13B:
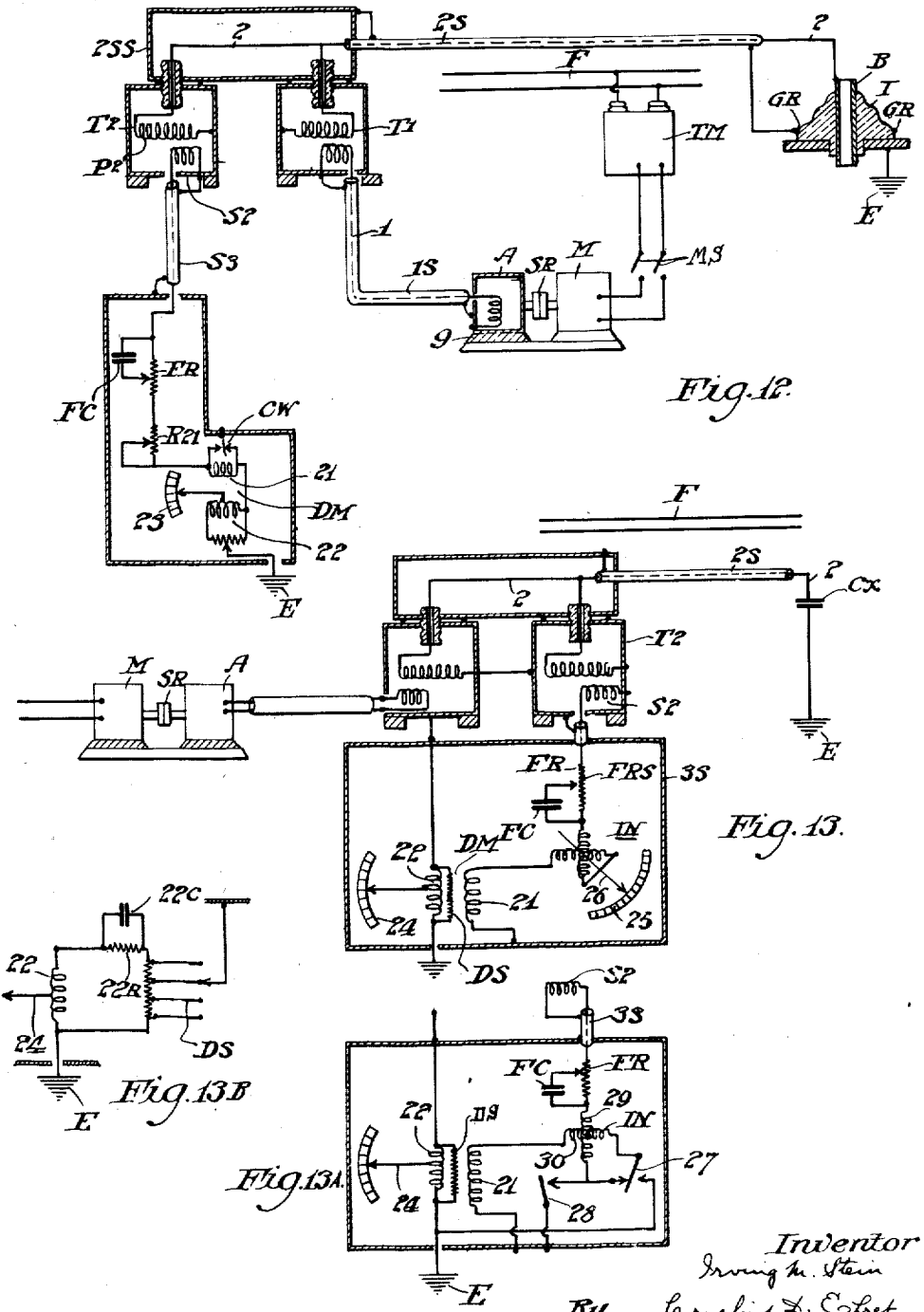
Fig. 12 is a diagrammatic view of a system in accordance with my invention embodying an electro-dynamometer or wattmeter.
Fig. 13 is a diagrammatic view of a system in accordance with my invention embodying apparatus for measuring power factor by a phase-defect method.
Fig. 13A is a fragmentary diagram of a system constituting a modification of Fig. 13 or equivalent whereby in addition to power factor there may be measured capacitance of the dielectric specimen.
Fig. 13B is a fragmentary diagram illustrating means for changing the range of parts of systems such as Figs. 13 and 13A.

Referring to Fig. 12, the source A, transformers T1, T2, and the connections therebetween and to the bushing of the insulator under test may be the same as in Fig. 1. The secondary S2 of the step-down transformer T2 is connected to the potential coil 21 of a sensitive wattmeter DM, or a dynamometer, through a resistance R21 and a phase correction network comprising the condenser FC and resistance FR. The current through the specimen I flows through the current coil 22 of the dynamometer DM, returning to the low tension side of the secondary winding S2 through the shield S3. With the switch CW in the position shown, the energy loss of the insulator I may be directly read from the scale 23 of the dynamometer; when the switch CW is thrown to its other position, the coil 21 no longer receives current from the secondary S2 but instead is connected in series with the current coil 22. For this position of the switch, the current through the insulator may be read directly from the scale 23. From these two readings, the power factor and capacitance of the insulator are determinable, the voltage and the ratio and phase angle of transformer T2 being known.

In this modification, as in those previously described, the use of a test frequency suitable different from the frequency of disturbing electromagnetic and electrostatic fields makes unnecessary the provision of any system of double shields, or any other expedient to correct for errors of measurement due to external fields from neighboring high tension conductors or apparatus.

The arrangement shown in Fig. 13 employs still another method of measurement in which a dynamometer DM is used as a null instrument. The connections between the source A and the transformers T1 and T2, and the connections between the transformers and the specimen under test are the same as in Fig. 1, for example. In this modification, the potential coil 21 of the dynamometer DM is energized from the secondary winding S2 of the step-down transformer T2, the circuit including an inductometer or variometer IN and a suitable network of resistance and capacity FC and FR to compensate for the phase defect of the transformer T2, the inductance of the potential coil of the dynamometer, and the residual inductance of the inductometer IN, and is preferably provided with a scale FRS calibrated in voltages or equivalent phase angles. The current coil 22 of the dynamometer is connected as in Fig. 12 so that the current through the specimen CX traverses it. In making the test the movable coil of the inductometer IN, in series with the fixed coil, is adjusted until there is no deflection of the pointer 24 associated with the movable coil of the dynamometer. The power factor of the sample may then be read directly from the calibrated scale 25 associated with the pointer 26 movable with the adjustable coil of the inductometer.

By providing a simple switching arrangement such as shown in Fig. 13A, the same apparatus may be used to measure either the capacitance or the power factor of the specimen CX. When the switches 27 and 28 are in the position shown in Fig. 13A, the connections to the coils of the dynamometer and inductometer are the same as for Fig. 13 for measurement of power factor. When the switches 27 and 28 are thrown to the right, one coil, as 29, of the inductometer is connected by switch 28 through the shield 3S directly to the other terminal of the secondary S2, instead of in series with the other coil 30 of the inductometer and the voltage coil of the dynamometer; the movement of switch 27 to the right connects the other coil 30 of the inductometer and the fixed coil 21 of the dynamometer in series across the coil 22 of the dynamometer and its shunt DS. With the switches so thrown to the right, the movable coil of the inductometer is then adjusted until there is no deflection of the dynamometer, and when this condition obtains the capacitance of the specimen is directly read from a second calibrated scale associated with the pointer 26 of the inductometer, Fig. 13.

To suit the apparatus for different ranges of measurement, the shunt DS across the current coil 22 of the dynamometer may be a compensated Ayrton shunt (Fig. 13B), the auxiliary resistance 22R and condenser 22C compensating for the inductance of coil 22.

From these measurements, the conductance or impedance of the dielectric may be computed, and the applied voltage being known, the energy loss in the dielectric of the insulator may also, if desired, be calculated.

Figure 14:
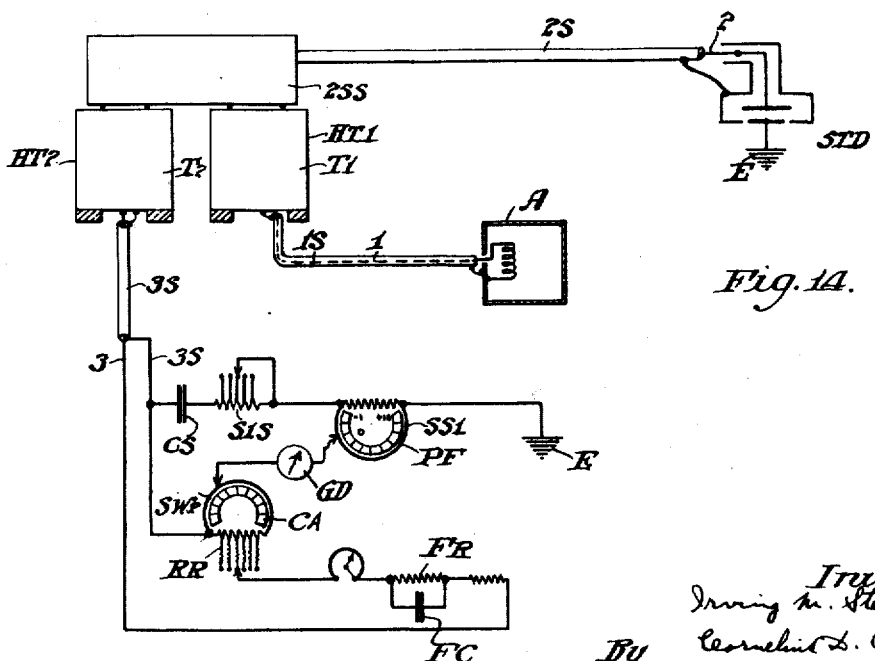
Fig. 14 is a diagrammatic view of another system in accordance with my invention.

Fig. 14 illustrates a system generally the same as that of Figs. 1–3, differing principally in that the power factor scale PF associated with the slide-wire SS1 includes readings of negative as well as positive power factors.

In a system such as shown in Fig. 1, it may be desirable to make the standard condenser CS a replaceable unit, so that standard condensers of various magnitudes of capacity may be used to increase the range of the measurements beyond that which would be permissible for a particular single standard condenser CS. For such purpose any reasonably good mica condenser, for example (may be used, and it may be that its phase angle is undetermined, or at least different from others previously used in a particular set.

It may be necessary or desirable also to use a different step-down potential transformer T2; for instance, the one furnished with the measuring set may become defective; or it may be desirable to make measurements at a higher test voltage, in which case a different transformer T2 is desirable or necessary.

In the event the phase angle or phase defect angle of either the substitute condenser CS or of the substitute step-down potential transformer T2, or both, is or are unknown, accurate measurements are obtainable by connecting between conductor or lead 2 and earth a standard condenser STD, which may be a zero-loss air condenser or at least a standard high-voltage condenser having a known phase angle.

The substitute potential-transformer's phase angle may be either positive or negative, and the phase angle of the substitute condenser CS is usually such as to be equivalent to a resistance in series with a condenser having zero phase angle. Therefore, when checking against a standard zero or low loss high-voltage condenser STD, balance of the network may require the contact associated with slidewire SS1 to be in a position below the zero point of the power factor scale, so corresponding with a negative power factor. To obtain a quantitative value for the correction, for the phase angle defect of the substitute condenser CS and/or the substitute transformer T2, to be applied to the readings later obtained when a dielectric specimen is substituted for the condenser STD, the slidewire SS1 is provided with a power factor scale PF readable in terms of both positive and negative power factors.

The zero point of the scale PF is located at some suitable distance from the point corresponding to zero resistance of SS1; and the resistance between the zero power factor position and zero resistance position of contact C1, is compensated by the combination of fixed resistance FR and fixed condenser FC of proper magnitudes.

With the arrangement shown in Fig. 14, the measurements of the power factor and capacitance of a specimen are corrected without compensation for the phase defect angles of the substitute transformer T2 and/or substitute condenser CS; in contradistinction from Fig. 1 in which the phase angle defect of transformer T2 is individually corrected by the adjustable phase shifting unit FR-FC, and the phase angle defect of condenser CS is individually and independently compensated for by series resistance RCS.

What I claim is:

1. The method of determining, within an alternating field, an electrical characteristic of a dielectric, which comprises subjecting the dielectric to an alternating voltage of test frequency differing from the frequency of the alternating field, to produce a current of magnitude determined by the capacitance and conductance of the dielectric, passing all of said current through a condenser and the current due to said alternating field in series with said dielectric, and determining a characteristic of the dielectric by the magnitude of said current of test frequency only through said condenser.

2. The method of determining an electrical characteristic of a dielectric, which comprises subjecting the dielectric to an alternating voltage, passing through a condenser an alternating current definitely related in magnitude to that of the current traversing said dielectric, and determining a characteristic of the dielectric by the magnitude of the current through said condenser, said condenser having a capacity of magnitude rendering negligible the effect of stray capacity effectively in shunt with said condenser.

3. The method of determining an electrical characteristic of a dielectric, which comprises subjecting the dielectric to an alternating voltage, passing through a measuring impedance a current whose magnitude is definitely related to that of the current traversing said dielectric, rendering negligible the effects of stray capacity effectively in shunt with said impedance by including in said impedance a capacity large with respect to the stray capacity, and determining a charatceristic of the dielectric by the magnitude of the current through said impedance.

4. The method of determining, within an alternating field, the power factor of a dielectric specimen, which comprises impressing upon the specimen an alternating test voltage, different in frequency from the frequency of said alternating field, to produce an alternating electrical effect by the resulting current of test frequency through said specimen, producing an alternating electrical effect of the frequency of said test voltage, adjusting the phase of one of said effects until they are in quadrature, and determining the power factor of said specimen from the extent of said phase adjustment.

5. The method of determining, within an alternating field, the capacitance of a dielectric specimen, which comprises impressing upon the specimen an alternating test voltage, of frequency different from the frequency of said alternating field, to produce an alternating electrical effect by the resulting current of test frequency through said specimen, producing an alternating electrical effect of the frequency of and having predetermined phase relation with respect to said test voltage, and balancing said second electrical effect against the component of said first electrical effect which is in quadrature with the test voltage.

6. The method of determining, within an alternating field, the power factor and capacitance of a dielectric specimen, which comprises impressing upon the specimen an alternating test voltage, having a frequency different from the frequency of said alternating field, to produce an alternating electrical effect by the resulting current of test frequency through the specimen, producing an alternating electrical effect of adjustable magnitude having the frequency of and having predetermined phase relation with respect to said test voltage, and balancing the inphase and quadrature components of said first alternating electrical effect against said second alternating electrical effect.

7. The combination with a system, for determining a characteristic of a dielectric exposed to an alternating field and having one side connected directly to ground, comprising a source of alternating test voltage having its terminals ungrounded, means for indicating the effect of said voltage upon the dielectric interposed between ground and one of said ungrounded terminals of said source, and ungrounded shielding means providing a path exclusive of said indicating means for charging current due to said voltage impressing means, of means for rendering said system substantially immune from the effects of said alternating field comprising means for imparting to said alternating test voltage a frequency different from that of said alternating field.

8. The combination with a system, for determining a characteristic of a dielectric specimen exposed to an alternating field, comprising a source of high-tension alternating test voltage of frequency different from the frequency of said field, conductors from said source to said specimen, a measuring impedance in one of said conductors traversed by the current of test frequency through said dielectric, and shielding, exposed to said field, for one of said conductors connected to such side of said measuring impedance that charging current of that conductor to the shielding does not traverse said impedance and such that current induced in said shielding by said alternating field traverses said impedance.

9. The combination with a system, for determining, within an alternating field, a characteristic of a dielectric exposed to said field, comprising means for impressing an alternating test voltage, of frequency different from the frequency of said field, upon the dielectric, a measuring impedance in circuit with said dielectric and said source, shielding means providing for charging current due to said source a path exclusive of said impedance and providing for currents induced by said alternating field a path including said impedance, and indicating means associated with said impedance insensitive to currents of the frequency of said alternating field.

10. A system for determining, within an alternating field, a characteristic of a dielectric specimen exposed to said field and having one side connected directly to ground comprising a source of high tension test voltage having a frequency different from the frequency of said alternating field and having its terminals grounded, a source of low tension voltage of the same frequency as and having predetermined phase relation with respect to said high tension voltage and having its terminals ungrounded, measuring means, conductor for applying said high tension voltage of test frequency to said specimen and a component of said measuring means in series therewith, conductor for applying said low tension voltage of test frequency to another component of said measuring means, and shielding for said high tension and low tension conductors exposed to said field and connected to divert from said measuring means the charging currents of test frequency of said conductors and to conduct to said measuring means currents induced on the shielding by said field.

11. A system for determining, within an alternating field, a characteristic of a dielectric specimen comprising a source of high tension test voltage having a frequency different from the frequency of said alternating field, a source of low tension voltage of the same frequency as and having predetermined phase relation with respect to said high tension voltage, a balanceable measuring network, means for applying said high tension voltage of test frequency to said specimen and to an impedance of the network in series therewith, means for applying said low tension voltage of test frequency to another impedance of said network, and means, connected between said impedances, responsive to current of test frequency and insensitive to currents of the frequency of said alternating field.

12. A system for measuring a characteristic of a dielectric having one side grounded, comprising apparatus and connections for producing and applying a high tension alternating test voltage to said specimen and to a measuring impedance in series therewith, said impedance including capacity whose magnitude is large relative to the stray capacity to ground of said apparatus and connections, and which is effectively in shunt to said measuring impedance.

13. A measuring system comprising a balanceable network, a source of alternating current connected thereto, means responsive to unbalance of said network comprising an alternating current galvanometer whose field is excited from said source and whose movable element is energized in accordance with the unbalance of said network, means for shifting the phase of the current of said field approximately ninety degrees, and means interposed between said network and said galvanometer to permit continuous adjustment through a substantial range of the phase of the current in the movable element of said galvanometer.

14. A measuring system for determining a characteristic of a dielectric specimen having one side grounded and shunted by serially related capacities, comprising a source of alternating voltage having one terminal connected to the ungrounded side of said specimen and its other terminal connected to the grounded side of said specimen through measuring means, and a second source of alternating voltage having one terminal grounded and its other terminal connected to a common terminal of said capacities to apply thereto a potential at all instants substantially equal to the potential of the ungrounded side of said specimen.

15. A measuring system for determining a characteristic of a dielectric specimen having one side grounded and shunted by serially related capacities, comprising a source of alternating current having one of its terminals connected to the ungrounded side of said specimen, and its other terminal connected to the grounded side of said specimen through measuring means, and a connection from said other terminal of said source to a common terminal of said capacities.

16. A test set for determining characteristics of dielectrics of cables, insulators or the like comprising a source of high tension alternating voltage, measuring apparatus, and means for connecting said measuring apparatus and said source to the dielectric under measurement, said source and said connecting means having stray capacity, effectively in a path in shunt to said measuring apparatus, whose magnitude is different for different test environments, and a capacity comprised in said measuring apparatus and whose magnitude is such as to swamp and render substantially negligible the effects upon said measuring apparatus of said stray capacity.

17. A test set for determining a characteristic of the dielectric of an installed cable, insulator or the like, comprising a source of high tension alternating voltage, measuring apparatus, and means for connecting said apparatus and said source to the dielectric under measurement, said source and said connecting means having stray capacity, effectively in a path in shunt to said measuring apparatus, and whose magnitude is different for different test environments, and a capacity associated with said measuring apparatus and whose magnitude with respect to said stray capacity avoids need for adjustment or additional test to compensate or correct for the variations in magnitude of said stray capacity encountered for different test environments.

18. In a test set for determining characteristics of the dielectrics of cables, insulators or the like in the presence or absence of an alternating electro-magnetic or electro-static field and comprising a source of high tension alternating voltage, measuring apparatus, and means for connecting said apparatus and said source to the dielectric under measurement, means for insuring correct determination of said characteristic by a single measurement comprising, shielding means for diverting the charging current of said source and said connecting means from the measuring apparatus and simultaneously to pass current due to said alternating field through said measuring apparatus, means for providing that the frequency of the current from said source is different from the frequency of said alternating field, and capacity, in said measuring apparatus, of magnitude large with respect to stray capacity, of said source and said connecting means, effectively in shunt to said measuring apparatus and different in magnitude for different test environments.

19. A system for determining, within an alternating electro-magnetic or electro-static field, a characteristic of a dielectric having one side grounded, comprising a source of high tension alternating voltage of frequency different from the frequency of said field, a conductor from the high potential terminal of said source to the ungrounded side of said dielectric, measuring means including impedances one of which is traversed solely by current of the frequency of said source and another of which is connected between the low potential terminal of said source and ground, and shielding for said conductor and said source connected to said low potential terminal to divert the charging current of said conductor from said measuring means, said shielding being exposed to said field whereby said second-named impedance is traversed by current from said source through the dielectric and by current induced by said alternating field.

20. A system for determining, within an alternating electro-magnetic or electro-static field, a characteristic of a dielectric having one side grounded, comprising a source of high-tension alternating voltage of frequency different from the frequency of said field, a conductor from the high potential terminal of said source to the ungrounded side of said dielectric, a measuring impedance connected between the low potential terminal of said source and the grounded side of said dielectric, a shield for said conductor connected to said low potential terminal and exposed to said field whereby current induced by said field and current from said source through the dielectric traverse said measuring impedance, and indicating means associated with said measuring impedance responsive to current of the frequency of said source and insensitive to current of the frequency of said field.

21. A system for determining a characteristic of a dielectric comprising a metallically encased step-up transformer, a shielded lead from the high-potential terminal of the secondary of said transformer to one side of the dielectric, a metallically encased step-down transformer having its primary connected in shunt to the secondary of said step-up transformer, measuring means including impedances, conductors for connecting one of said impedances between the low-tension terminal of said step-up transformer and the other side of said dielectric, a shielded lead for connecting the primary of said step-down transformer to another of said impedances, an alternator, a shielded lead for connecting said alternator to the primary of said set-up transformer, and means connecting the shields of all of said leads and the metallic casings of said transformers to said low tension terminal.

22. A system for determining, within an alternating field, a characteristic of a dielectric specimen comprising a source of high tension test voltage having a frequency different from the frequency of said alternating field, a source of low tension voltage of the same frequency as and having predetermined phase relation with respect to said high tension test voltage, a balanceable electrical system including means for indicating unbalance thereof, means for applying said high tension voltage of test frequency to said specimen and to an element of said balanceable system in series with said specimen, and means for applying said low tension voltage of test frequency to another element of said balanceable system, and means for passing through one of said elements current due to said alternating field and to which current said indicating means is insensitive.

23. A measuring system for determining a characteristic of a dielectric specimen shunted by serially related capacities, comprising a source of alternating test voltage, connections from said source to said specimen, measuring means in one of said connections, and a second source of alternating voltage connected across one of said capacities and of such magnitude and phase relation with respect to said test voltage that no voltage difference exists across the other of said capacities.

24. Apparatus for measuring an electrical characteristic of a dielectric comprising a source of alternating test voltage, and a balanceable system including a measuring impedance, variable to balance said system, and traversed by current from said source through said dielectric, said impedance comprising capacity and resistance in series with each other and of such relative magnitudes that, at least for dielectrics of low power factor, and at balance of said system, the voltage drop across the capacity, for aforesaid current through the dielectric, materially exceeds the simultaneous voltage drop across said resistance.

25. Apparatus for measuring an electrical characteristic of a dielectric comprising a source of alternating test voltage, and a balanceable system including a measuring impedance, variable to balance said system, and traversed by current from said dielectric through said dielectric, said impedance comprising capacity and resistance in series with each other, said capacity having a reactance, at the frequency of said test voltage, which is small as compared with the reactance at said frequency of all capacities of the system effectively in shunt to said impedance, and said reactance of said capacity, at least for specimens of low power factor, and at balance of said system, greatly predominating over the magnitude of said resistance.

26. Apparatus for measuring an electrical characteristic of a dielectric comprising a source of alternating test voltage and a balanceable system including a measuring impedance traversed by current from said source through the dielectric, said impedance comprising capacity and resistance, at least one of which is variable to balance said system, in series with each other and of such relative magnitudes that the reactive component of said impedance at balance of said system predominates over the resistive component of said impedance.

27. Apparatus for measuring an electrical characteristic of a dielectric comprising a source of alternating test voltage and a balanceable system including a measuring impedance traversed by current from said source through the dielectric, said impedance comprising a capacity of fixed magnitude and a resistance, variable to balance said system, and of such relative magnitudes that at balance of said system the reactive component of said measuring impedance predominates over the resistive component of said impedance.

28. Apparatus for measuring an electrical characteristic of a dielectric comprising a source of alternating test voltage and a balanceable system including a measuring impedance traversed by current from said source through the dielectric, said impedance comprising a capacity and a resistance, at least one of which is variable to balance said system, of such relative magnitudes at balance of said system that the reactive component of said measuring impedance predominates over the resistive component of said impedance, said capacity having such magnitude as effectively to swamp the capacities in shunt to said measuring impedance.

29. Apparatus for measuring an electrical characteristic of a grounded dielectric comprising a source of alternating test voltage and a balanceable system including a measuring impedance connected between ground and a terminal of said source, said impedance comprising a capacity and a resistance, at least one of which is variable to balance said system, of such relative magnitudes that at balance of said system the reactive component of said measuring impedance predominates over the resistive component of said impedance, said capacity having such magnitude as effectively to swamp the capacities in shunt to said measuring impedance.

30. Apparatus for measuring the power factor of a dielectric comprising a source of alternating test voltage and a balanceable electrical system having a measuring impedance, traversed by current from said source through the dielectric, and including capacity and resistance, in series with each other, and at least one of which is variable to bring said electrical system to balance, said capacity and resistance having such magnitudes that at balance of said system the ratio to each other of the resistive and reactive components of said impedance is substantially equal to the co-tangent of the angle whose co-sine represents the power factor of said dielectric.

31. Apparatus for measuring the power factor of a dielectric comprising a source of alternating test voltage and a balanceable electrical system comprising a measuring impedance, traversed by current from said source through the dielectric, including capacity of fixed magnitude and a resistance, in series with said capacity and variable to balance said electrical system, said resistance and capacity having such magnitudes that at balance of said system the ratio to each other of the resistive and reactive components of said impedance is substantially equal to the co-tangent of the angle whose co-sine represents the power factor of said dielectric.

32. Apparatus for measuring an electrical characteristic of a grounded dielectric comprising a source of alternating test voltage, a connection from one terminal of said source to the ungrounded side of said dielectric, a balanceable electrical system comprising impedance connected between the other terminal of said source and the grounded side of said dielectric, a second impedance comprised in said system, a source of current in circuit with said second impedance and whose voltage is in fixed phase relation to aforesaid test voltage, a conductor connecting one terminal of said second impedance to a point whose potential differs from ground and from either terminal of said first named source, and a shield for said conductor connected to said other terminal of said source.

33. Apparatus for determining within an alternating field one or more characteristics of a dielectric comprising a source of alternating test voltage, measuring means connected in circuit with said source of voltage and the dielectric, a shielding system exposed to said alternating field and connected to divert from said measuring means charging current due to said source of alternating test voltage and to pass through said measuring means current due to said alternating field, said measuring means comprising a capacity through which pass the test current through the dielectric and a current from said shielding system due to said alternating field, said capacity having magnitude such as to swamp the capacities, including capacity in part formed by said shielding system, effectively in parallel with said measuring means, and means for determining a characteristic of the dielectric from the magnitude of only the test current passed through the dielectric and said first-named capacity.

34. Apparatus for determining within an alternating field one or more characteristics of a grounded dielectric comprising a source of alternating test voltage of frequency differing from the frequency of said field, measuring means connected in circuit with said source of voltage and the dielectric, a shielding system exposed to said alternating field and connected to divert from said measuring means charging current due to said source of alternating test voltage and to pass through said measuring means current due to said alternating field, said measuring means comprising a capacity through which pass the test current through the dielectric and current from the shielding system due to said alternating field, said capacity having a magnitude such as to swamp the capacities, including capacity between said shielding system and ground, effectively in shunt to said measuring means, and means for determining a characteristic of the dielectric from the magnitude of only the current of test frequency passed through said first named capacity.

35. Apparatus for determining within an alternating field one or more characteristics of a dielectric comprising a source of alternating test current, measuring means connected in circuit with said source and the dielectric, a shielding system exposed to said alternating field and connected to divert from said measuring means charging current due to said source of alternating test current and to pass through said measuring means current due to said alternating field, and capacities, including capacity in part formed by said shielding system, effectively in parallel with said measuring means and together constituting an impedance of magnitude high with respect to the impedance of said measuring means, whereby there is diverted from said measuring means by said capacities only an insubstantial proportion of aforesaid test current through the dielectric and the current from said shielding system due to said alternating field, and means for determining a characteristic of the dielectric from the magnitude of only the test current passed through the dielectric and said measuring means.

36. A system for measuring within an alternating field an electrical characteristic of a dielectric comprising a source of electrical energy, a translating device energized from said source to produce high-tension alternating test voltage, connections from said translating device to the dielectric, measuring means including impedance in one of said connections traversed by current from said device and by current induced by said alternating field, means for determining from said first-named current an electrical characteristic of said dielectric, and means preventing effect upon said last-named means by reversal of the phase relations of said currents.

37. A system for determining a characteristic of a dielectric specimen comprising a measuring impedance connected to one side of said specimen, two transformer windings having a common terminal, a conductor from another terminal of one of said windings to the other side of said specimen, a conductor from another terminal of the other of said windings to said measuring impedance, and a shielding system connected to the common terminals of said windings for shielding said windings and said conductors.

38. A system for determining a characteristic of a grounded dielectric specimen comprising a high-voltage source having one terminal connected to the ungrounded side of said specimen, measuring means having one terminal connected to the other terminal of said voltage source, means for connecting another terminal of said measuring means to ground to complete a high-voltage circuit through said specimen and said measuring means, and means for rendering said high-voltage source inoperative upon failure of said connecting means.

39. A system for determining a characteristic of a grounded dielectric specimen comprising a high-voltage source having one terminal connected to the ungrounded side of said specimen, measuring means having one terminal connected to the other terminal of said voltage source, a circuit controlling energization of said high-voltage source, and means detachably connected to ground to complete a high-voltage circuit from said source through said specimen and said measuring means and for interrupting said control circuit, when detached from ground, to effect deenergization of said high-voltage source.

40. The method of determining an electrical characteristic of a dielectric which comprises passing an alternating current through the dielectric and all of said current through serially related capacity and resistance, and determining a characteristic of the dielectric from the resulting voltage drop across said capacity and resistance.

IRVING M. STEIN.

CERTIFICATE OF CORRECTION.

Patent No. 2,178,617.   November 7, 1939.

IRVING M. STEIN.

It is hereby certified that error appears in the printed specification of the above numbered patent requiring correction as follows: Page 4, second column, line 19, after the reference character "K2" insert a comma; page 5, first column, line 24, after "A" insert a comma; lines 65 and 72, after "used" insert a comma; line 70, after "Fig. 1" insert a comma; page 6, first column, line 12, after the word "field" insert --, by using a switch to reverse the connections of one pair of the conductors of the three-phase field--; lines 15 and 16, strike out "ing apparatus is calibrated for use at the chosen test frequencies, if other comparative measure-"; and second column, line 24, after "1S" insert a comma; page 7, second column, line 43, after "RR" insert a comma; page 10, first column, line 4-5, after "galvanometer" insert a comma; page 12, second column, line 24, for "(may" read --, may--; page 13, first column, line 12, claim 1, strike out the comma after "field"; lines 15 and 16, same claim, strike out "and the current due to said alternating field" and insert the same after "current" in line 14, same claim 1; and second column, line 63, claim 10, for "grounded" read --ungrounded--; page 15, first column, line 27, claim 21, for "set-up" read --step-up--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.

said source through said specimen and said measuring means and for interrupting said control circuit, when detached from ground, to effect deenergization of said high-voltage source.

40. The method of determining an electrical characteristic of a dielectric which comprises passing an alternating current through the dielectric and all of said current through serially related capacity and resistance, and determining a characteristic of the dielectric from the resulting voltage drop across said capacity and resistance.

IRVING M. STEIN.

CERTIFICATE OF CORRECTION.

Patent No. 2,178,617.   November 7, 1939.

IRVING M. STEIN.

It is hereby certified that error appears in the printed specification of the above numbered patent requiring correction as follows: Page 4, second column, line 19, after the reference character "K2" insert a comma; page 5, first column, line 24, after "A" insert a comma; lines 65 and 72, after "used" insert a comma; line 70, after "Fig. 1" insert a comma; page 6, first column, line 12, after the word "field" insert --, by using a switch to reverse the connections of one pair of the conductors of the three-phase field--; lines 15 and 16, strike out "ing apparatus is calibrated for use at the chosen test frequencies, if other comparative measure-"; and second column, line 24, after "1S" insert a comma; page 7, second column, line 43, after "RR" insert a comma; page 10, first column, line 4-5, after "galvanometer" insert a comma; page 12, second column, line 24, for "(may" read --, may--; page 13, first column, line 12, claim 1, strike out the comma after "field"; lines 15 and 16, same claim, strike out "and the current due to said alternating field" and insert the same after "current" in line 14, same claim 1; and second column, line 63, claim 10, for "grounded" read --ungrounded--; page 15, first column, line 27, claim 21, for "set-up" read --step-up--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.